US009035623B1

(12) United States Patent
Berkowitz et al.

(10) Patent No.: US 9,035,623 B1
(45) Date of Patent: May 19, 2015

(54) MONITOR AND CONTROL CIRCUITRY FOR CHARGING A BATTERY/CELL, AND METHODS OF OPERATING SAME

(71) Applicant: Qnovo Inc., Newark, CA (US)

(72) Inventors: Fred Berkowitz, Los Gatos, CA (US); Nadim Maluf, Los Altos, CA (US); Mark Gurries, San Jose, CA (US); Miroslav Zmrzli, San Francisco, CA (US); David Bruce Koons, Los Gatos, CA (US)

(73) Assignee: Qnovo Inc., Newark, CA (US)

( * ) Notice: Subject to any disclaimer, the term of this patent is extended or adjusted under 35 U.S.C. 154(b) by 13 days.

(21) Appl. No.: 13/747,914

(22) Filed: Jan. 23, 2013

(51) Int. Cl.
*H02J 7/06* (2006.01)
*H02J 7/00* (2006.01)

(52) U.S. Cl.
CPC ..................... *H02J 7/007* (2013.01)

(58) Field of Classification Search
USPC ................. 320/112, 134, 141, 164
See application file for complete search history.

(56) References Cited

U.S. PATENT DOCUMENTS

| | | | |
|---|---|---|---|
| 6,707,272 B1 | 3/2004 | Thandiwe | |
| 6,841,974 B2 | 1/2005 | Dykeman | |
| 7,737,665 B2 | 6/2010 | Grewe et al. | |
| 8,350,531 B2 | 1/2013 | Morimoto et al. | |
| 2001/0011881 A1* | 8/2001 | Emori et al. | 320/116 |
| 2002/0001745 A1* | 1/2002 | Gartstein et al. | 429/61 |
| 2011/0285356 A1* | 11/2011 | Maluf et al. | 320/139 |

* cited by examiner

*Primary Examiner* — Edward Tso
*Assistant Examiner* — Aaron Piggush
(74) *Attorney, Agent, or Firm* — Neil A. Steinberg

(57) ABSTRACT

Circuitry and techniques to measure, at the battery's terminals, characteristic(s) of the charging signal applied to the battery/cell during the recharging operation and, in response to feedback data which indicates the charging signal is out-of-specification, control or instruct the charging circuitry to adjust characteristic(s) of the recharging signal (e.g., the amplitude of the voltage of and/or current applied to or removed from the battery during the charging operation). For example, a rechargeable battery pack comprising a battery, and controllable switch(es), a current meter and voltmeter, all of which are fixed to the battery. Control circuitry generates control signal(s) to adjust a current and/or voltage of the charging signal using the feedback data from the current meter and/or voltmeter, respectively.

25 Claims, 29 Drawing Sheets

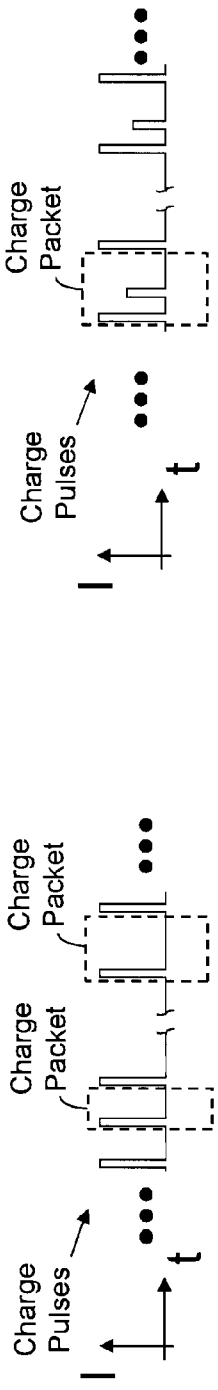
FIGURE 4A
FIGURE 4B
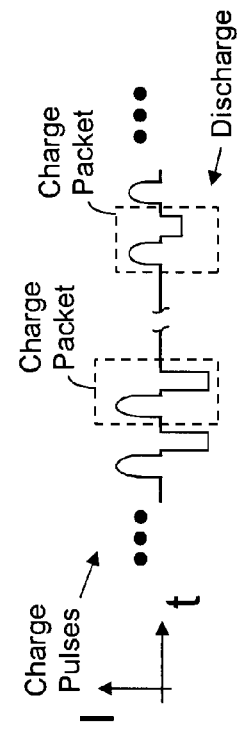
FIGURE 4C
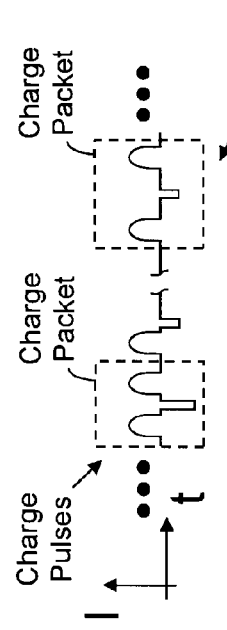
FIGURE 4D
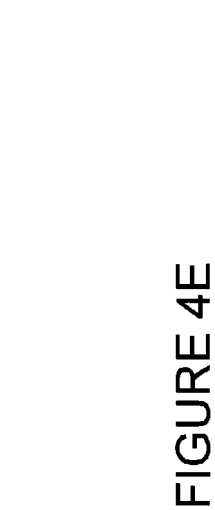
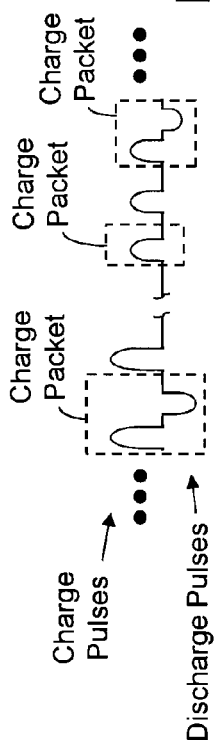
FIGURE 4E

MONITOR AND CONTROL CIRCUITRY FOR CHARGING A BATTERY/CELL, AND METHODS OF OPERATING SAME

The present inventions relate to circuitry for and methods of monitoring and/or controlling the charging or re-charging (hereinafter collectively "charging") operation of a battery/cell. In particular, in one embodiment, recharge monitor and control circuitry and techniques according to aspects of the present invention measure or monitor, at the terminals of the battery/cell, one or more characteristics of the charging signal applied to the battery/cell during the charging operation and, in response thereto, control or instruct the charging circuitry to adjust one or more characteristics of the charging signal (for example, the amplitude of the voltage of and/or current applied to or removed from the battery/cell during the charging operation) where such voltage and/or current is outside of a predetermined range. For example, in the context of a constant-current, constant-voltage technique ("CCCV") charging technique, the circuitry and techniques of the present invention may adjust the amplitude of the applied current and/or voltage, in accordance with a voltage and current measured at the terminals of the battery/cell, by directly controlling the charging circuitry and/or by indirectly controlling circuitry (for example, power management circuitry) that controls the charging circuitry. Similarly, in the context of a pulse current charging technique, the circuitry and techniques of the present invention may adjust the amplitude and duration of the applied current pulses (whether charging or discharging pulses) in accordance with a voltage and current measured at the terminals of the battery/cell, by directly or indirectly controlling the charging circuitry.

In one embodiment, monitor circuitry is physically disposed on, integrated with and/or fixed to the battery/cell to measure, detect and/or monitor the voltage of and/or current applied to or removed from a battery/cell during the charging operation. The monitor circuitry may include a sensor to determine or measure a voltage (for example, a voltmeter) and/or a sensor to determine or measure a current (for example, a current meter). Indeed, in one embodiment, the monitor circuitry implements Kelvin-type measurement configurations in that little to no current is required to determine the voltage at the terminals of the battery/cell and/or the current through the battery/cell.

The control circuitry may receive the voltage and/or current data (for example, data which is in analog or digital form) from the monitor circuitry and determine, assess and/or evaluate whether such data is within a predetermined range, above a predetermined first value and/or below a predetermined second value (that is, out-of-specification). Where the control circuitry determines such voltage and/or current data are/is out-of-specification, the control circuitry may directly or indirectly control the charging circuitry to adjust one or more characteristics of the charging signal so that the voltage of and/or current applied to or removed from a battery/cell during the charging operation is within-specification (that is, within the predetermined range, below the predetermined first value and/or above the predetermined second value. The control circuitry, like the monitor circuitry, may also be physically disposed on, integrated with and/or fixed to the battery/cell.

In one embodiment, the monitor circuitry and/or the control circuitry of the present inventions are physically disposed/integrated on and/or in, or fixed to one or more substrates (preferably, one substrate) which is/are physically disposed on or in, integrated with and/or fixed to the battery/cell. For example, substrate (upon which the monitor and/or control circuitry are physically disposed/integrated on and/or in, or fixed to) is integrated in a battery/cell pack, for example, an enclosed or a "self-contained" battery/cell pack which may also include a wrap (for example, a plastic or the like film) substantially encapsulating the substrate-battery/cell combination. Here, the substrate upon which the monitor circuitry resides may be physically disposed on and/or fixed to the terminals of the battery/cell. In this way, the monitor circuitry may more quickly and accurately measure, detect and/or monitor the voltage of and/or current applied to or removed from a battery/cell during the charging operation. Moreover, the control circuitry may be disposed on the same substrate as the monitor circuitry and juxtaposed portions thereof to receive, assess and evaluate the feedback data and, in response thereto, determine, whether such data is out-of-specification, and if so, generate instructions or control signal to directly or indirectly control the charging circuitry by adjusting the voltage of and/or current applied to or removed from the battery/cell during the charging operation.

Notably, the substrate is a mechanical support for the monitor and/or control circuitry. The substrate, in addition thereto or in lieu thereof, may include electrical interconnects between (i) the electronic or electrical components of the monitor and/or control circuitry and/or (ii) the terminals of the battery/cell and the monitor and/or control circuitry. Such interconnects may be conductive pathways, tracks or signal traces—for example, conductive paths etched from copper or the like and laminated or fixed onto a non-conductive structure. The substrate may be rigid, flexible, pliable and/or deformable. For example, in one embodiment, the substrate is a rigid, flexible, pliable and/or deformable printed circuit board or the like wherein monitor circuitry is disposed (for example, mounted) thereon and electrically connected to the terminals of the battery.

As mentioned above, where the control circuitry determines the voltage and/or current data measured by the monitor circuitry are/is out-of-specification, the control circuitry may directly or indirectly control the charging circuitry to adjust one or more characteristics of the charging signal. For example, where a system includes conventional battery or power management circuitry (for example, an application processor) to control/instruct the charging circuitry to generate and apply a certain voltage and/or current to a battery/cell, the control circuitry may indirectly control the charging circuitry via providing instructions or control signals to the conventional battery or power management circuitry. Here, the control circuitry, based on or using the voltage and/or current data measured by the monitor circuitry, determines a change necessary to adjust one or more characteristics of the charging signal to be within specification, and, in response, generates instructions or control signals. The conventional battery or power management circuitry, in response to such instructions or control signals adjusts one or more characteristics of the charging signal via direct control of the operation of the charging circuitry.

Notably, in other embodiments, the control circuitry is electrically coupled to the charging circuitry to directly control, for example, the amplitude of voltage and/or current output by the charging circuitry. In this way, the control circuitry directly controls charging circuitry via application of suitable control signals to adjust one or more characteristics of the charging signal (for example, the maximum amplitude of the voltage and/or current signals applied to the battery/cell) so that the charging is within specification.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

FIG. 1C illustrates circuitry external which accesses the memory to store one or more predetermined ranges and/or limits employed by control circuitry in conjunction with adapting, adjusting and/or controlling one or more characteristics of the charge or current applied to or injected into the battery/cell so that a change in voltage at the terminals of the battery/cell in response to such charge or current is within a predetermined range and/or below a predetermined value during a charging or recharging sequence, operation or cycle;

FIGS. 4A-4E illustrate exemplary charge and/or discharge packets of the charging and discharging signals (which are exemplary illustrated in FIGS. 3A-3D), wherein such charge and discharge packets may include one or more charge pulses and one or more discharge pulses; notably, in one embodiment, each charge signal of FIGS. 3A-3D may include a plurality of packets (for example, about 100 to about 50,000 packets) and, in one embodiment, each packet may include a plurality of charge pulses, discharge pulses and rest periods; notably, the pulses may be any shape (for example, rectangular, triangle, sinusoidal or square); in one exemplary embodiment, the charge and/or discharge pulses of the packet may include a temporal duration of between about 1 ms to about 2000 ms, and preferably less than 1000 ms; moreover, as discussed in detail below, one, some or all of the characteristics of the charge and discharge pulses (for example, pulse amplitude, pulse width/duration and pulse shape) are programmable and/or controllable via charging circuitry wherein the amplitude of the positive and/or negative pulses may vary within the packet (and are programmable and/or controllable), the duration and/or timing of the rest periods may vary within the packet (and are programmable and/or controllable) and/or, in addition, such pulses may be equally or unequally spaced within the packet; the combination of charging pulses, discharging pulses and rest periods may be repetitive and thereby forms a packet that may be repeated; all combinations or permutations of pulse, pulse characteristics, periods, packets and signal characteristics and configurations are intended to fall within the scope of the present inventions; notably, such one or more charge pulses and/or one or more discharge pulses (including, for example, pulses of charge and/or discharge packets) may be generated via the controllable switch(es) of the charging circuitry (see, for example, FIGS. 1F-1I and 1L);

Figure 1B:
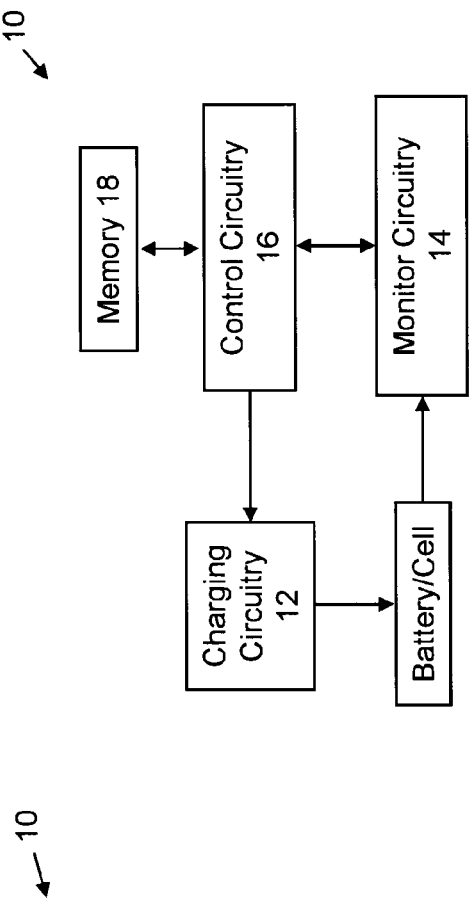
FIGS. 1A-1C illustrate block diagram representations of exemplary recharge monitor and control circuitry in conjunction with charging circuitry and a battery/cell, wherein FIG. 1B includes discrete memory coupled to the control circuitry.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

Moreover, many other aspects, inventions and embodiments, which may be different from and/or similar to, the aspects, inventions and embodiments illustrated in the drawings, will be apparent from the description, illustrations and claims, which follow. In addition, although various features and attributes have been illustrated in the drawings and/or are apparent in light thereof, it should be understood that such features and attributes, and advantages thereof, are not required whether in one, some or all of the embodiments of the present inventions and, indeed, need not be present in any of the embodiments of the present inventions.

DETAILED DESCRIPTION

In a first aspect, the present inventions are directed to recharge monitor and control circuitry, and techniques implemented thereby, to measure or monitor, at the terminals of the battery/cell, one or more characteristics of the signal (for example, the voltage of and/or current applied to or removed from the battery/cell during the charging operation) applied to the battery/cell during the charging operation and, in response thereto, control or instruct the charging circuitry to adjust one or more characteristics of the charging signal where such voltage and/or current is consistent with a requested, programmed or desired voltage and/or current. The monitor circuitry of the present inventions, in one embodiment, is physically disposed on, integrated in and/or fixed to the battery/cell, to implement techniques to measure and monitor the charging operation of a battery/cell. In one embodiment, the monitor circuitry includes voltage sensors (such as a voltmeter) and/or current sensors (such as a current meter) which are/is electrically connected to the terminals of the battery/cell to measure, detect and/or monitor the voltage of and/or current applied to or removed from a battery/cell during operation (for example, the charging operation).

In one embodiment, the monitor circuitry is physically disposed/integrated on and/or in one or more substrates (preferably, one substrate—for example, a rigid, flexible, pliable and/or deformable substrate) which is/are physically disposed on, integrated with and/or fixed to the battery/cell. For example, the battery/cell wherein a substrate (including circuitry according to the present inventions) is/are physically disposed thereon, integrated therewith and/or fixed thereto may form, in combination, a "self-contained" battery/cell pack. The battery/cell pack may also include a plastic or plastic-like wrap that substantially encapsulates the substrate-battery/cell combination (or other thin wrap material that substantially encapsulates the substrate-battery/cell combination). Here, the substrate upon which the monitor circuitry resides may be physically disposed on and/or fixed to the terminals of the battery/cell. In one embodiment, the substrate is a rigid, flexible and/or deformable printed circuit board or the like wherein monitor circuitry is disposed (for example, mounted) thereon or therein and electrically connected to the terminals of the battery. In this way, the monitor circuitry may more accurately and rapidly measure, detect and/or monitor the voltage of and/or current applied to or removed from a battery/cell during the charging operation.

Notably, in one embodiment, the monitor circuitry implements Kelvin-type measurement configurations in that little to no current is employed or required to determine the voltage at the terminals of the battery/cell and/or the current through the battery/cell.

The control circuitry employs the voltage and/or current feedback data from the monitor circuitry and determines, assesses and/or evaluates whether such data is consistent with one or more requested, programmed or desired values (for example, the maximum amplitude of the voltage and/or current output by the charging circuitry are/is within a predetermined range). In one embodiment, control circuitry (in whole or in part) is also physically disposed on, integrated in and/or fixed to the battery/cell. (See, for example, FIGS. 1F-1J). In another embodiment, the control circuitry is not physically disposed on, integrated in and/or fixed to the battery/cell (for example, such circuitry may be disposed on a substrate (for example, a separate and/or secondary substrate such as, for example, a "mother" or "daughter" type board) which is not fixed to the battery/cell). (See, for example, FIGS. 1K and 1L).

In operation, where the control circuitry determines such voltage and/or current data are/is not consistent with one or more programmed or desired values or out-of-specification (for example, the maximum amplitude of the voltage and/or current signals applied to the battery/cell, as measured by the monitor circuitry, are/is outside of a predetermined range corresponding to one or more programmed or desired values—for example, the maximum amplitude of the voltage and/or current is less than requested, programmed and/or desired), the control circuitry may directly or indirectly control charging circuitry to adjust one or more characteristics of the charging signal applied to the battery/cell so that the voltage of and/or current applied to or removed from a battery/cell during the charging operation is consistent with one or more requested, programmed or desired values or within-specification (for example, the amplitude of the voltage and/or current applied to the battery/cell, as measured by the monitor circuitry, are/is within the predetermined range). Notably, in a preferred embodiment, at least a portion of the control circuitry (for example, a portion of circuitry that controls the switch(es) and/or determines, assesses and/or evaluates whether the voltage and/or current feedback data from the monitor circuitry is consistent with one or more requested, programmed or desired values (for example, the maximum amplitude of the voltage and/or current output by the charging circuitry are/is within a predetermined range) is also physically disposed on, integrated with and/or fixed to the battery/cell.

The monitor circuitry and control circuitry may be physically disposed on, integrated in and/or fixed to the battery/cell which, as mentioned above, may in combination form a battery/cell "pack". In addition thereto, in one embodiment, the monitor circuitry and control circuitry are physically disposed on or in one or more substrates (for example, rigid, flexible, pliable and/or deformable substrate(s)), and preferably on the same substrate, which is/are physically disposed on, integrated in and/or fixed to the battery/cell. For example, the control circuitry (which may consist of discrete and/or integrated circuits) is juxtaposed portions of the monitor circuit (which also may consist of discrete and/or integrated circuits) to receive voltage and/or current feedback data and, in response thereto, determine, whether such data is in-specification or out-of-specification, and if out-of-specification, generate instructions or control signal to directly or indirectly control the charging circuitry and thereby adjust the voltage of and/or current applied to or removed from the battery/cell during the charging operation. In one embodiment, substrate 102 is a rigid, flexible and/or deformable printed circuit board or the like wherein monitor circuitry is disposed (for example, mounted) thereon or therein and electrically connected to the terminals of the battery. The monitor circuitry and control circuitry may be physically disposed on, integrated in and/or fixed to the battery/cell which, as mentioned above, may in combination form an enclosed or "self-contained" battery/cell "pack" (for example, a battery/cell pack which may be enclosed via a film or wrap substantially encapsulating the substrate-battery/cell combination—for example, a plastic or plastic-like wrap (for example, a plastic or plastic-like film, such as a thermal shrinkable film) that substantially encapsulates the substrate-battery/cell combination).

Figure 2:
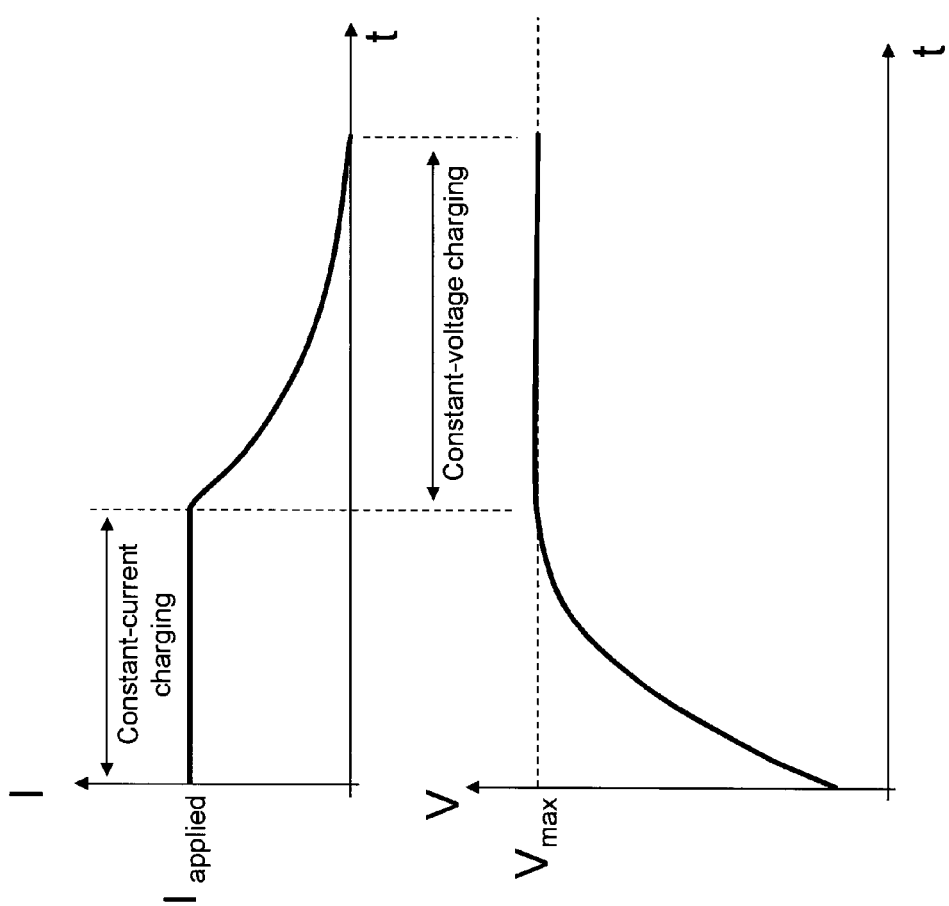
FIG. 2 illustrates current and voltage of a battery/cell as a function of time illustrating the conventional charging method known as constant-current, constant-voltage (CCCV); notably, a conventional method to charge a rechargeable battery, including a lithium-ion type rechargeable battery, employs a CCCV technique, wherein the charging sequence includes a constant-current (CC) charging mode until the terminal voltage of the battery/cell is at about a maximum amplitude (for example, about 4.2V to 4.5V for certain lithium-ion type rechargeable batteries) at which point the charging sequence changes from the constant-current charging mode to a constant-voltage (CV) charging mode, wherein in the CV mode, a constant voltage is applied to the terminals of the battery/cell; in the CCCV technique, the charging circuitry often changes from the CC charging mode to the CV charging mode when the state of charge (SOC) of the battery/cell is at about 60-80%.
Figure 3A:
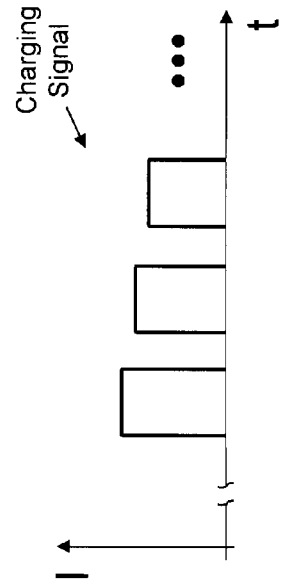
FIGS. 3A-3D illustrate exemplary waveforms illustrating a plurality of exemplary charging signals and discharging signals of an exemplary charging technique, wherein such charging signals may generally decrease according to a predetermined rate and/or pattern (for example, asymptotically, linearly or quadratically) as the terminal voltage of the battery/cell increases during a charging or recharging sequence, operation or cycle (see, FIGS. 3B and 3D); notably, a charging or recharging sequence, operation or cycle may include charging signals (which, in total, inject or apply charge into the battery/cell) and discharging signals (which, in total, remove charge from the battery/cell); moreover, a pulse charging sequence or operation may include a constant voltage (CV) phase after a period of pulse charging and/or upon charging the battery/cell to a predetermined state of charge.
Figure 3B:
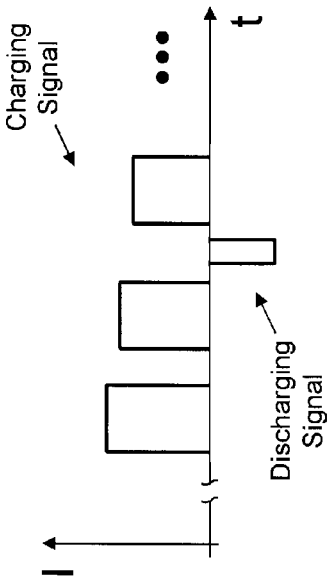
Figure 3C:
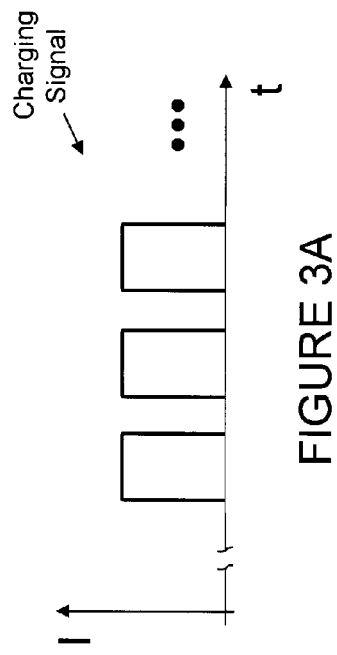
Figure 3D:
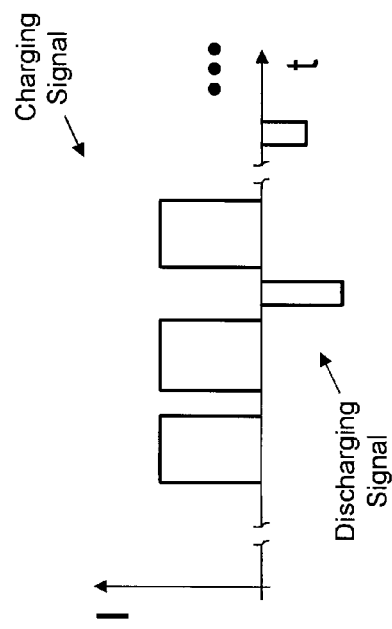

With reference to FIGS. 1A-1L, in one embodiment, the system includes charging circuitry 12 to responsively generate a supply voltage and/or current and applies such voltage and/or current to the battery/cell. For example, charging circuitry 12 may responsively generate a CCCV charging signal (see, for example, FIG. 2), a pulse charging signal (see, for example, FIGS. 3A-3D), or combination thereof. The charging circuitry 12 applies such signal to the battery/cell. Notably, the pulse charging signal may include one or more charging signals (which provide a net input of charge or current into the battery/cell) and one or more discharging signals (which provide a net removal of charge or current from the battery/cell). (See, for example, FIGS. 3C and 3D). Moreover, the charging and discharging signals may include a plurality of charge packets wherein each charge packet includes one or more charge pulses and, in certain embodiments, one or more discharge pulses. The charging and discharging signals may also include one or more discharge packets wherein each discharge charge packet includes one or more discharge pulses. (See, FIGS. 4A-4E).

In one embodiment, switch(es) 12(*b*) may be employed by control circuitry 16 to generate such pulses. (See, for example, FIGS. 1F-1I and FIGS. 4A-4E). In operation, control circuitry 16 enables and disables switch(es) 12*b*, which receive the output of the current source and/or voltage source 12*a*, to generate the characteristics of the pulses of the pulse charging signal applied to the battery/cell. For example, charging circuitry 12 of the present inventions may generate charging and discharging signals, packets and pulses (as described in detail in U.S. patent application Ser. Nos. 13/626,605 and 13/657,841, which applications are incorporated herein by reference in their entirety). The charging circuitry 12 is directly or indirectly responsive to control signals from control circuitry 16. Notably, the present inventions may employ any responsive charging circuitry 12, whether described herein, now known or later developed, to charge the battery/cell; all such charging circuitry 12 are intended to fall within the scope of the present inventions. Moreover, other circuitry may be adapted, configured and/or programmed (see, for example, the application processor in FIGS. 8A-8F) to generate and apply control signals to enable and disable switch(es) 12*b* to provide charging and/or discharging signals having one or more charge and/or discharge packets wherein each charge and/or discharge packet includes one or more charge pulses and/or one or more discharge pulses.

With continued reference to FIGS. 1A-1L, monitor circuitry 14 is electrically coupled to the terminals of the battery/cell and measures, monitors, senses, detects and/or samples (for example, on an intermittent, continuous and/or periodic basis, and/or in response to a triggerable event (for example, when the voltage and/or current output by charging circuitry 12 changes in accordance with a predetermined charging sequence)) one or more conditions or characteristics of the battery/cell including, for example, (i) the terminal voltage of the battery/cell and/or (ii) current applied to or removed from the battery/cell during the charging operation. In one embodiment, monitor circuitry 14 implements Kelvin-type measurement configurations in that little to no current is employed or required for the monitor circuitry to determine the voltage at the terminals of the battery/cell and the current through the battery/cell. The monitor circuitry 14 may consist of a single component (whether in integrated circuit or discrete form) or a multiplicity of components (whether in integrated circuit form, discrete form or otherwise), which are active and/or passive type components, and which are electrically coupled to measure, monitor, sense, detect and/or sample one or more conditions or characteristics of the battery/cell including, for example, (i) the terminal voltage of the battery/cell and/or (ii) current applied to or removed from the battery/cell during the charging operation.

Notably, the recharge monitor and control circuitry of the present inventions (and the inventive techniques implemented thereby) may employ any monitor circuitry 14 and/or measuring or monitoring techniques, whether described herein, now known or later developed, to acquire such data; all such monitor circuitry 14 and measuring or monitoring techniques are intended to fall within the scope of the present inventions. Indeed, monitor circuitry 14 may include one or more temperature sensors (not illustrated) which is/are thermally coupled to the battery/cell to generate, measure and/or provide data which is representative of the temperature of the battery/cell. As mentioned above, monitor circuitry 14 provides data, which is representative of the condition or characteristics of the battery/cell (for example, (i) the terminal voltage of the battery/cell and/or (ii) current applied to or removed from the battery/cell during the charging operation) to control circuitry 16.

With continued reference to FIGS. 1A-1L, control circuitry 16 is electrically coupled to monitor circuitry 14 to receive, sample, obtain and/or acquire feedback current data and/or feedback voltage data (which may be in analog or digital form) and employs the feedback data to calculate, determine and/or assess whether such data is consistent with one or more requested, programmed and/or desired values (for example, within a predetermined range). The control circuitry 16 may receive, sample, obtain and/or acquire the feedback current data and/or feedback voltage data from the monitor circuitry 14 on an intermittent, continuous and/or periodic basis, and/or in response to a triggerable event (for example, when the voltage and/or current output by charging circuitry 12 changes in accordance with a predetermined charging sequence).

The control circuitry 16 determines whether such feedback voltage and/or current data are/is not consistent with one or more requested, programmed and/or desired values or out-of-specification (for example, the maximum amplitude of the voltage and/or current signals applied to the battery/cell by charging circuitry 12 and as measured by the monitor circuitry, are/is outside of a predetermined range corresponding to one or more requested, programmed and/or desired values). As will be discussed in more detail below, in the event such data is out-of-specification, control circuitry 16 generates control signals to directly or indirectly control charging circuitry 12 in order adjust one or more characteristics of the charging signal applied to the battery/cell so that the voltage of and/or current applied to or removed from a battery/cell during the charging operation is consistent with one or more requested, programmed and/or desired values or within-specification (for example, the amplitude of the voltage and/or current applied to the battery/cell, as measured by the monitor circuitry, are/is within the predetermined range). In one embodiment, control circuitry generates control signals to increase the voltage and/or current output by charging circuitry 12 so that for example, the maximum amplitude of the voltage and/or current of the charging signal (output by charging circuitry 12) are/is within a requested, predetermined and/or desired range.

The predetermined range(s), upper limit value(s) and/or lower limit value(s) may be stored in discrete, integrated and/or embedded memory (for example, during manufacture, test and/or calibration). Indeed, the predetermined range(s) and limit(s) may be stored in any memory now known or later developed; all of which are intended to fall within the scope of the present inventions. For example, the memory may be a permanent, semi-permanent or temporary memory (for example, until re-programmed). In one embodiment, the memory may be one-time programmable, and/or the data, equations, relationships, database and/or look-up table of the predetermined range(s) may be stored in a one-time programmable memory (for example, programmed during test or at manufacture). In another embodiment, the memory is more than one-time programmable and, as such, the predetermined range(s) and/or limit(s) may be updated, written, re-written and/or modified after initial storage (for example, after test and/or manufacture) via external or internal circuitry.

Figure 1A:
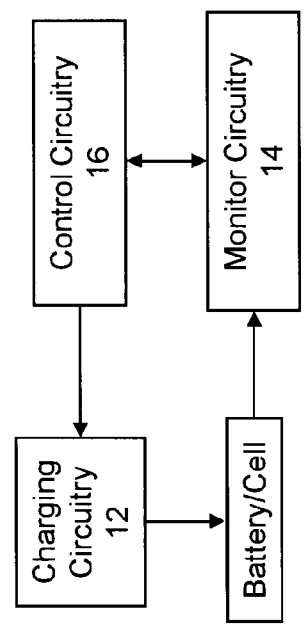
Figure 1C:
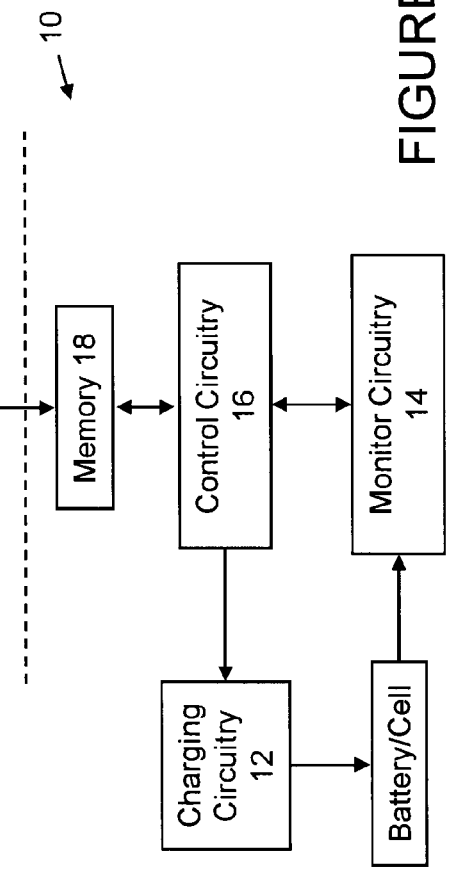
Figures 1D, 1E:
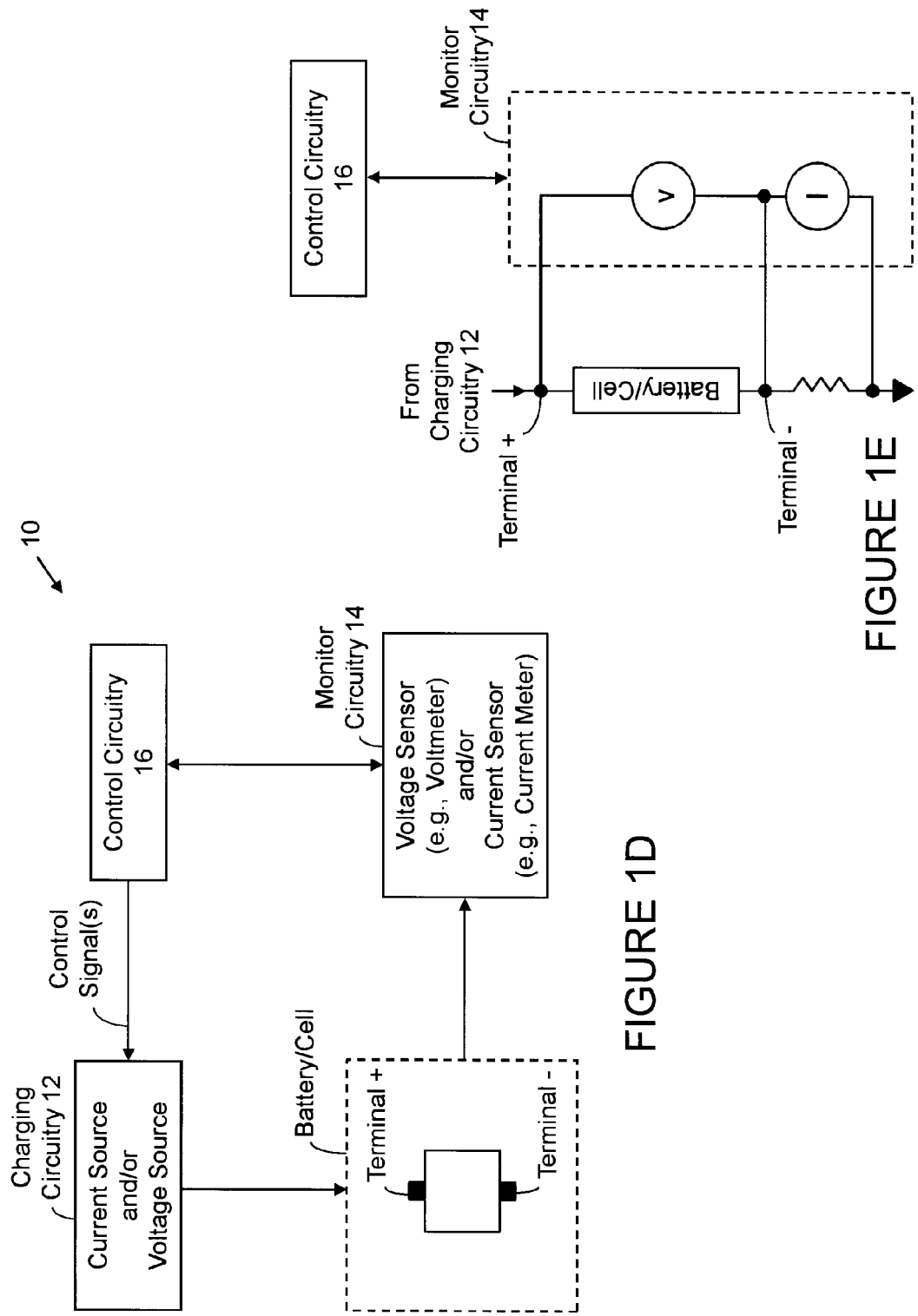
FIG. 1D illustrates, in block diagram form, exemplary recharge monitor and control circuitry in conjunction with charging circuitry and a battery/cell (which may include two terminals), wherein in these embodiments, the charging circuitry may include voltage source and/or current source, and the monitor circuitry may include voltage and/or current sensors (for example, a voltmeter and/or a current meter)
FIG. 1E illustrates, in block diagram form, exemplary recharge monitor and control circuitry in conjunction with charging circuitry and a battery/cell (which may include two terminals (for example, positive and negative terminals), according to at least certain aspects of certain embodiments of the present inventions, wherein in these embodiments, the monitor circuitry includes voltage and current sensors (for example, a voltmeter and/or a current meter, respectively); notably, the monitor circuitry may implement one or more Kelvin-type measurement configurations wherein little to no current is employed or required to determine the voltage at the terminals of the battery/cell and/or the current through the battery/cell.
Figure 1F:
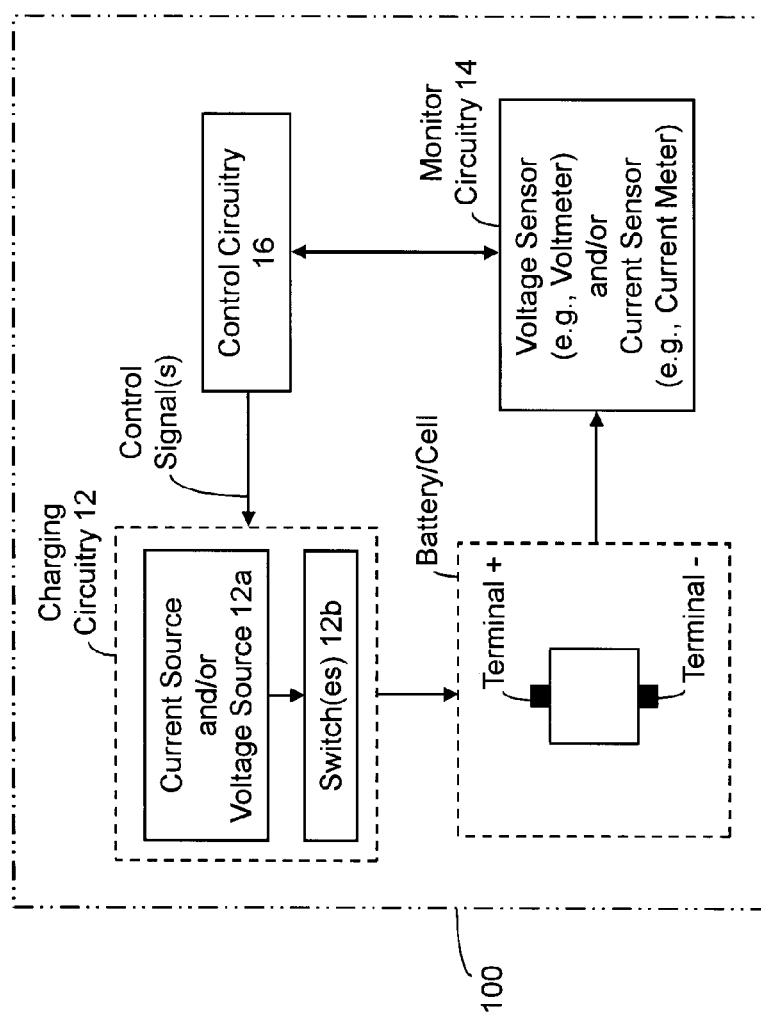
FIGS. 1F-1L illustrate, in block diagram form, exemplary recharge monitor and control circuitry in conjunction with charging circuitry and a battery/cell, according to at least certain aspects of certain embodiments of the present inventions, wherein in these embodiments, the charging circuitry may include voltage source and/or current source and switch (es), and the monitor circuitry may include voltage and/or current sensors (for example, a voltmeter and/or a current meter); notably, the charging circuitry may be entirely (or substantially entirely) physically disposed on/in, integrated with and/or fixed to the battery/cell (see, for example, FIGS. 1F and 1H), partially physically disposed on/in, integrated with and/or fixed to the battery/cell (see, for example, switch (es)-FIGS. 1G, 1I and 1L), or not physically disposed on/in, integrated with and/or fixed to the battery/cell (see, for example, FIGS. 1J and 1K), wherein such charging circuitry may be physically disposed on and/or in one or more substrates (for example, the same substrate as the monitor circuitry and/or control circuitry in those embodiments where the circuitry is physically disposed on/in, integrated with and/or fixed to the battery/cell); notably, in one embodiment, the charging circuitry may be physically disposed on/in, integrated with and/or fixed to the same or associated substrate as the control circuitry and monitor circuitry and wherein such substrate is physically disposed on/in, integrated with and/or in and/or fixed to the battery/cell as a battery/cell pack)
Figure 1G:
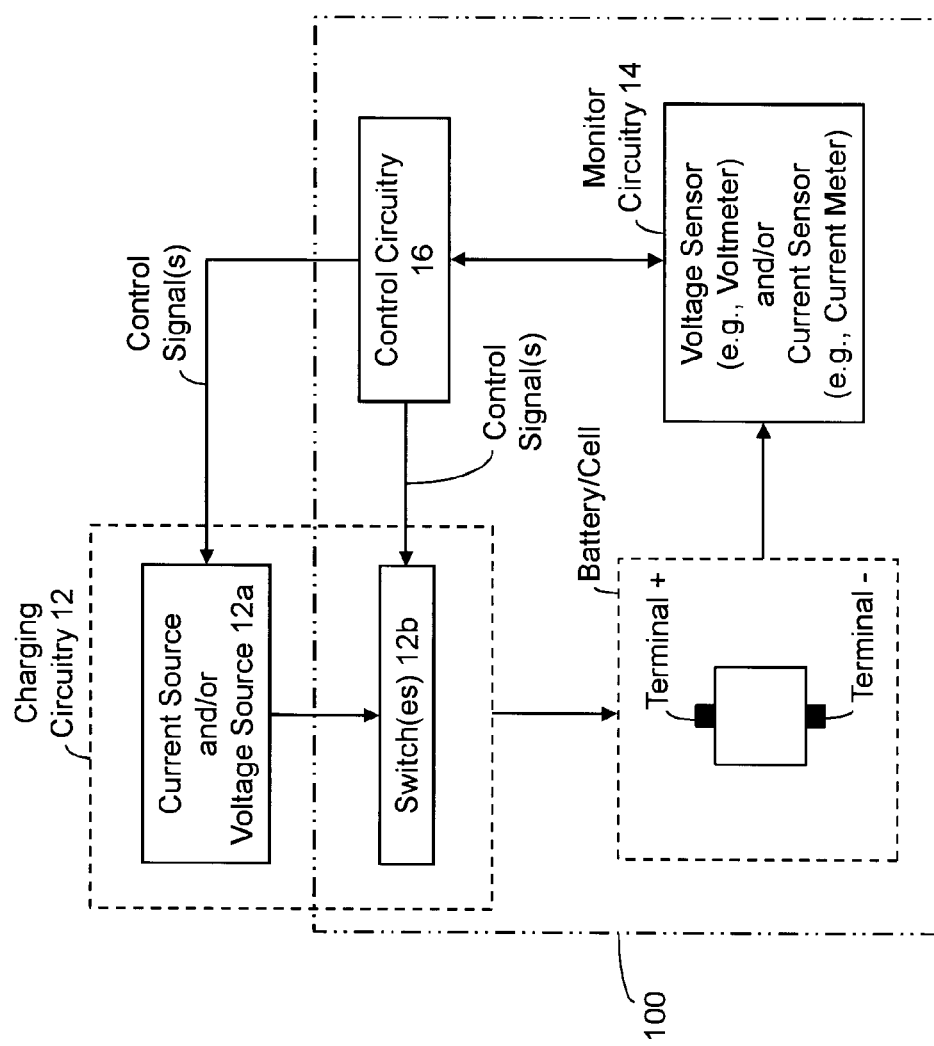
Figure 1H:
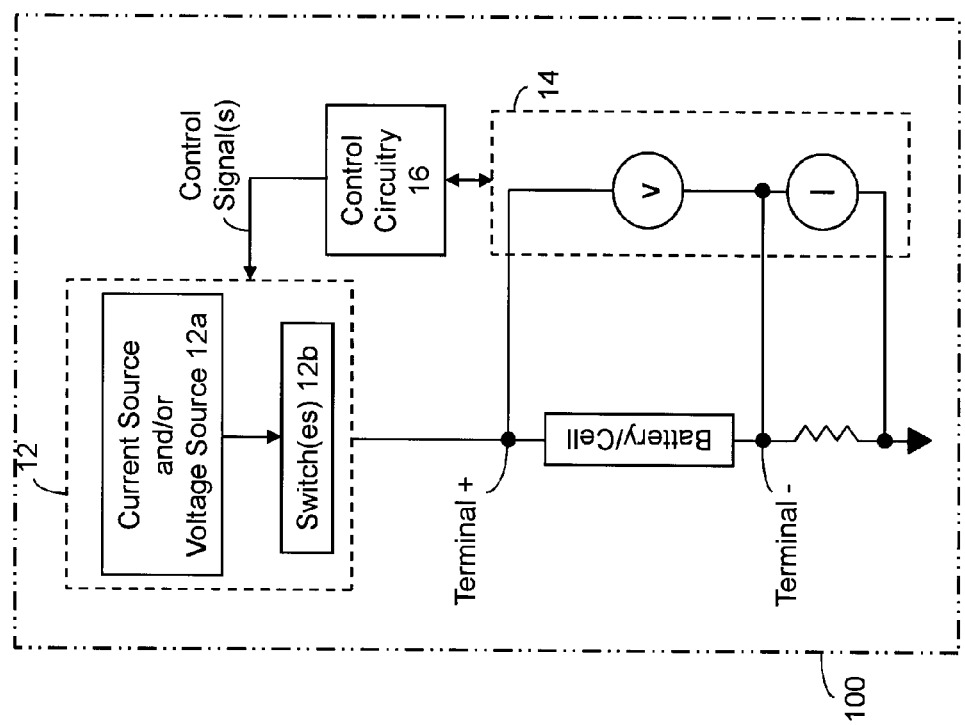
Figure 1I:
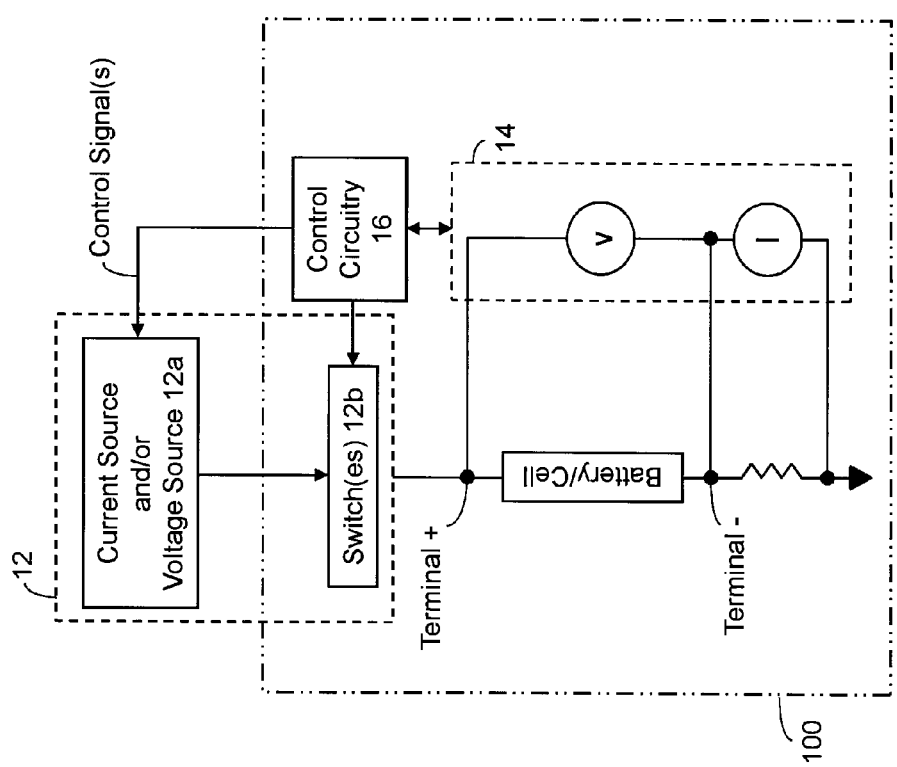
Figure 1J:
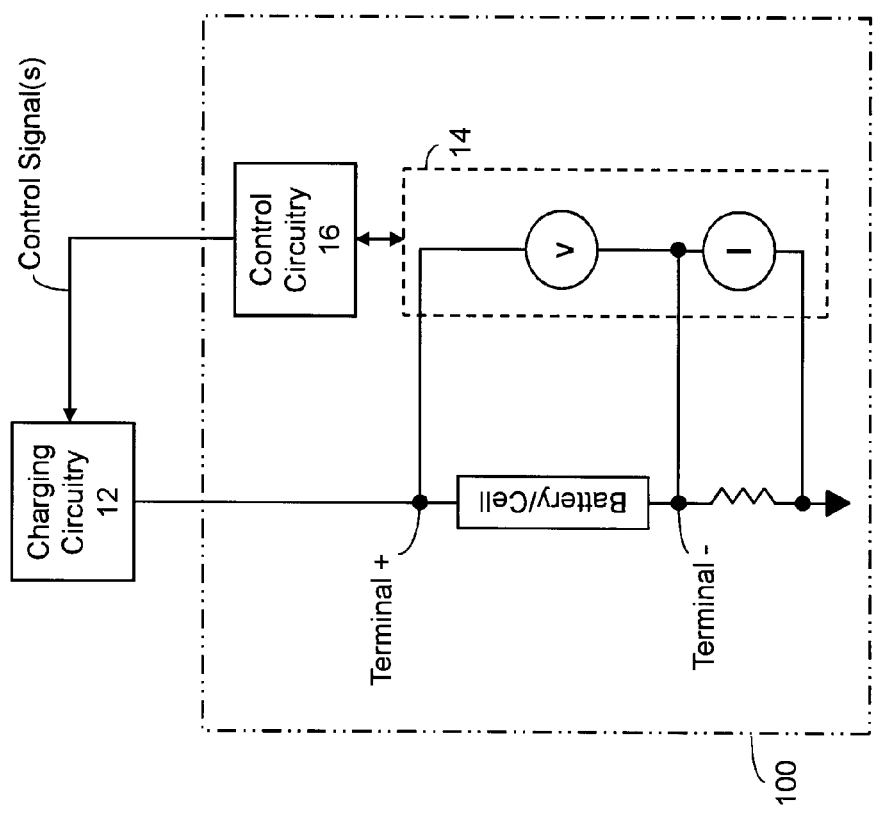
Figure 1K:
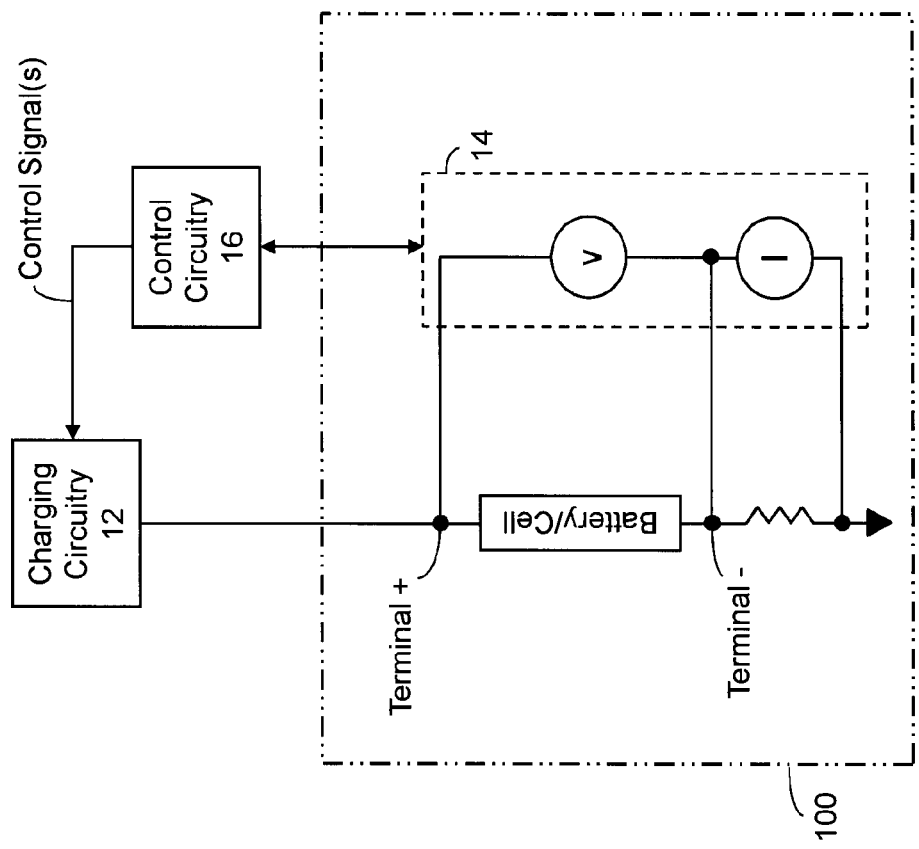
Figure 1L:
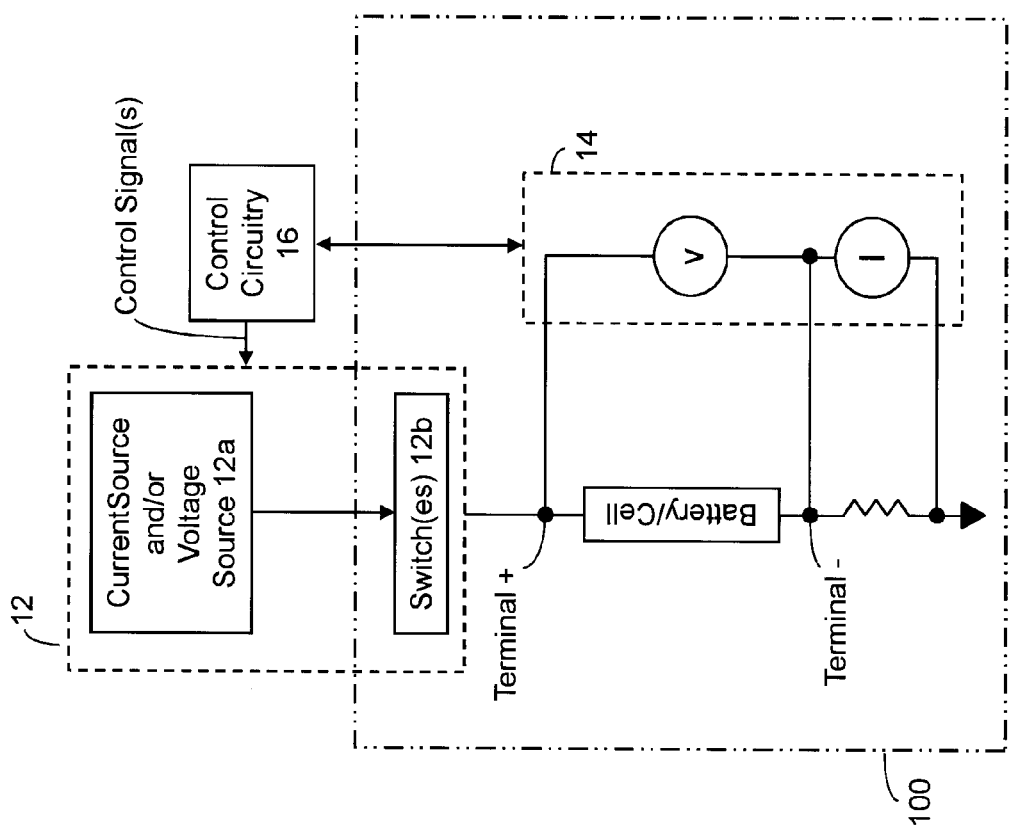

With reference to FIGS. 1A-1C, memory 18 may be integrated or embedded in other circuitry (for example, control circuitry 16) and/or discrete. The memory 18 may be of any kind or type (for example, EEPROM, Flash, DRAM, MRAM and/or SRAM). The memory 18 may store data which is representative of the predetermined ranges/limit(s), equations, and relationships. Such data may be contained in a database and/or look-up table.

Figure 5A:
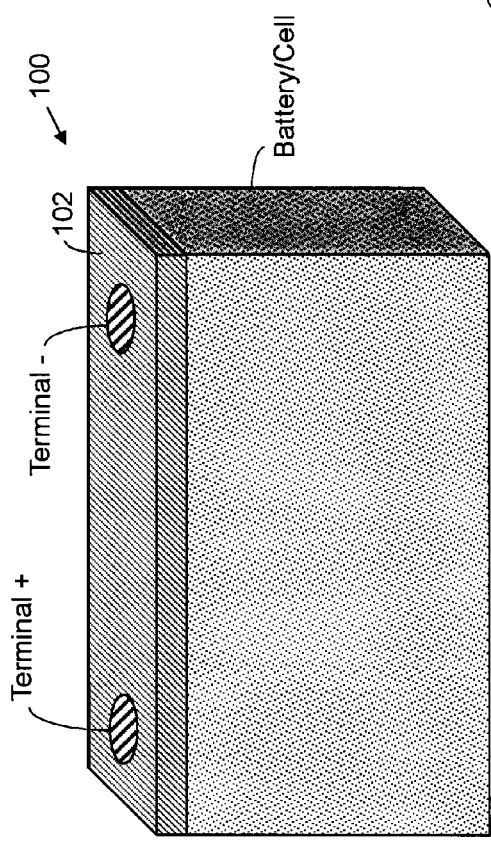
FIGS. 5A and 5B illustrate an exemplary embodiment of the recharge monitor and control circuitry physically disposed on, integrated with and/or fixed to a substrate which is physically disposed on, integrated in and/or fixed to the battery/cell (which may then, in combination, form a battery/cell "pack"—for example, an enclosed or a "self-contained" battery/cell pack which may include a plastic or plastic-like wrap encapsulating or substantially encapsulating the combination) according to at least certain aspects of certain embodiments of the present inventions; notably, the illustration of FIG. 5B is an exploded view of the exemplary embodiment of FIG. 5A.
Figure 5B:
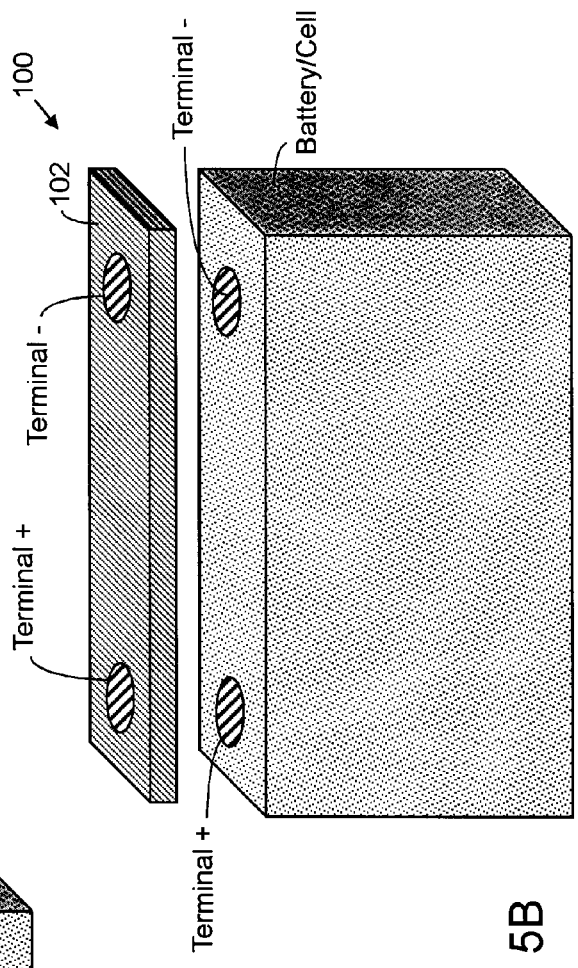
Figure 6A:
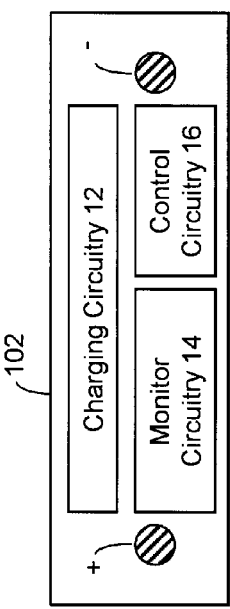
FIGS. 6A-6C illustrate, in block diagram form, exemplary embodiments of the recharge monitor and control circuitry and/or components that may reside on or integrated in the substrate which is physically disposed on, integrated in and/or fixed to the battery/cell pack, according to at least certain aspects of certain embodiments of the present inventions, notably, the charging circuitry, monitor circuitry, control circuitry and switch(es) may consist of a single component (whether in integrated circuit or discrete form) or a multiplicity of components (whether in integrated circuit form, discrete form or otherwise), which are active and/or passive, and which are electrically coupled to provide or perform a desired operation.
Figure 6B:
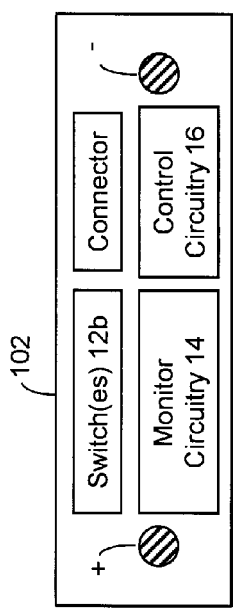
Figure 6C:
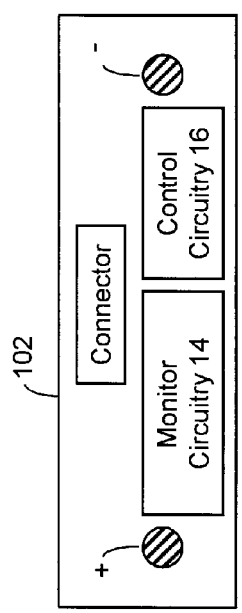

As mentioned above, monitor circuitry 14, in one embodiment, is physically disposed on, integrated in and/or fixed to the battery/cell, to implement techniques to measure and monitor the charging operation of a battery/cell—for example, to measure, detect and/or monitor the voltage of and/or current applied to or removed from a battery/cell during the charging operation. For example, with reference to FIG. 1F-1J, monitor circuitry 14 may physically disposed on, integrated with and/or fixed to the battery/cell to measure, detect and/or monitor the voltage of and/or current applied to or removed from a battery/cell during the charging operation. In one embodiment, monitor circuitry 14 is physically disposed or integrated on/in one or more substrates 102 which is/are physically disposed on, integrated with and/or fixed to the battery/cell (for example, integrated with the battery/cell which may form, in combination, battery/cell pack 100). (See, FIGS. 5A, 5B and 6A-6C). In one embodiment, substrate 102 (which includes monitor circuitry 14) is physically disposed on and/or fixed to the terminals of the battery/cell. (See, FIGS. 5A and 5B). In this way, monitor circuitry 14 may more accurately measure, detect and/or monitor the voltage of and/or current applied to or removed from the battery/cell during the charging operation.

In one embodiment, substrate 102 is a mechanical support for electronic or electrical components of monitor circuitry 14. In addition thereto or in lieu thereof, in another embodiment, substrate 102 is/are or provides electrical interconnects between electronic or electrical components of monitor circuitry 14 and the terminals of the battery/cell. Such interconnects may be electrically conductive pathways, tracks or signal traces—for example, conductive paths etched from copper or the like and laminated or fixed onto an electrically non-conductive underlying support.

The substrate 102 may be rigid, flexible, pliable and/or deformable. In one embodiment, substrate 102 is a rigid, flexible and/or deformable printed circuit board or the like wherein monitor circuitry is disposed (for example, mounted) thereon or therein and electrically connected to the terminals of the battery. Indeed, substrate 102 may be formed of a laminate, silicon, glass, plastic and/or thin film material. Indeed, any substrate material and/or composition, now known or later developed, are intended to fall within the scope of the present inventions.

The control circuitry 16 may also be physically disposed on, integrated in and/or fixed to the battery/cell. (See, for example, FIGS. 1F-1J). In one embodiment, monitor circuitry 14 and control circuitry 16 are disposed on or integrated in one or more substrates 102, and preferably on the same substrate, which is/are physically disposed on, integrated in and/or fixed to the battery/cell. (See, for example, FIGS. 5A, 5B and 6A-6C). For example, control circuitry 16 (which may consist of discrete and/or integrated circuits) in one embodiment, may be juxtaposed portions of monitor circuit 14 (which also may consist of discrete and/or integrated circuits) on substrate 102. Here, control circuitry 16 receives voltage and/or current feedback data from monitor circuitry 14 and, in response thereto, determines whether such data is in-specification or out-of-specification, and if out-of-specification, generates instructions or control signals to directly or indirectly control charging circuitry 12 and thereby adjust the voltage of and/or current applied to or removed from the battery/cell during the charging operation.

Notably, charging circuitry 12 (or portions thereof) may also be disposed on, integrated in and/or fixed to the battery/cell. In one embodiment, all or substantially all of charging circuitry 12 is physically disposed on, integrated in and/or fixed to the battery/cell. (See, for example, FIGS. 1F, 1H and 1L). In another embodiment, a certain portion of charging circuitry 12 (for example, controllable switch(es) 12b—in those embodiments that, for example, employ a pulse charging process) is physically disposed on, integrated in and/or fixed to the battery/cell. (See, for example, FIGS. 1G, 1I and 1L). Notably, in certain embodiments none of charge circuitry 12 is physically disposed on, integrated in and/or fixed to the battery/cell. (See, for example, FIG. 1J).

The charging circuitry 12 (or portions thereof) may also be disposed on or in one or more substrates 102. (See, FIGS. 5A, 5B, 6A and 6B). For example, in one embodiment, all or substantially all of charging circuitry 12 is disposed on or integrated in one or more substrates 102 (see, for example, FIG. 6A); in another embodiment, a certain portion thereof (for example, controllable switch(es) 12b) are disposed on or in one or more substrates 102 (see, for example, FIG. 6B). As mentioned above, substrates 102 may be physically disposed on, integrated in and/or fixed to the battery/cell. (See, for example, FIGS. 5A and 5B).

Figure 7A:
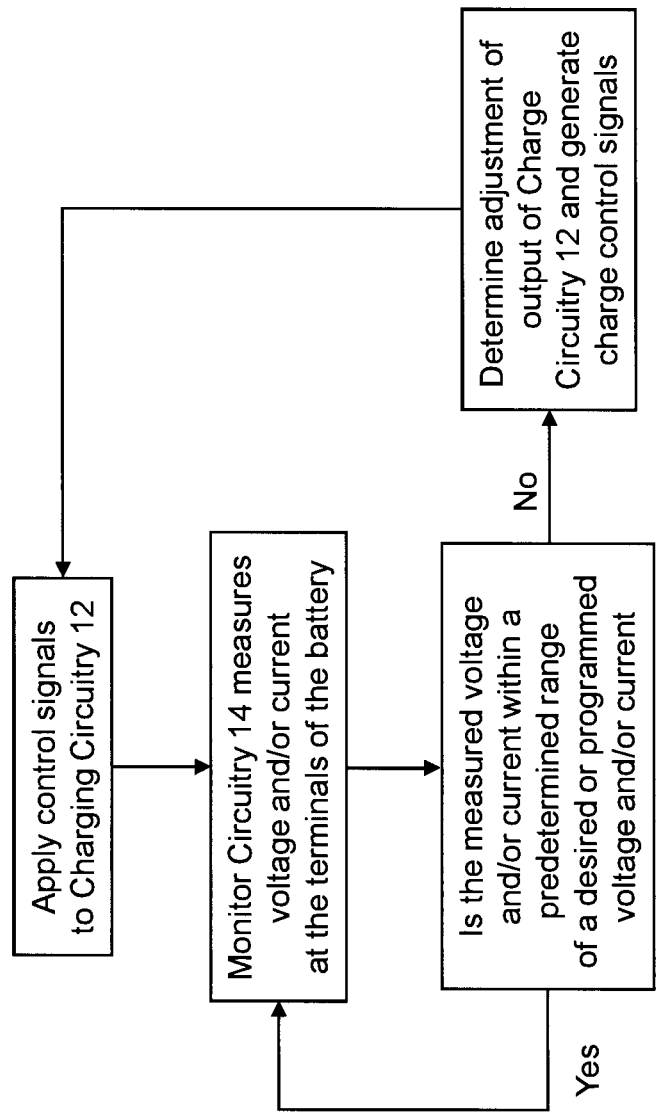
FIGS. 7A-7C are flowcharts of exemplary processes of monitoring and controlling the charging operation of the battery/cell, according to certain aspects of the present inventions, including monitoring one or more characteristics of the signal (for example, the voltage of and/or current applied to or removed from the battery/cell during the charging operation) applied to the battery/cell during the charging operation, and, in response to feedback data (for example, voltage and/or current data) from the monitor circuitry, determine one or more modifications and/or adjustments of the output of the charge circuitry when the measured voltage and/or current is outside a predetermined range relative to a requested, programmed or desired voltage and/or current (FIG. 7A), and/or (ii) less than a requested, predetermined upper limit value and/or within a predetermined range relative to a requested, programmed or desired voltage and/or current (FIG. 7B) and/or (iii) greater than a predetermined lower limit value and/or within a predetermined range such voltage and/or current (FIG. 7C)
Figure 7B:
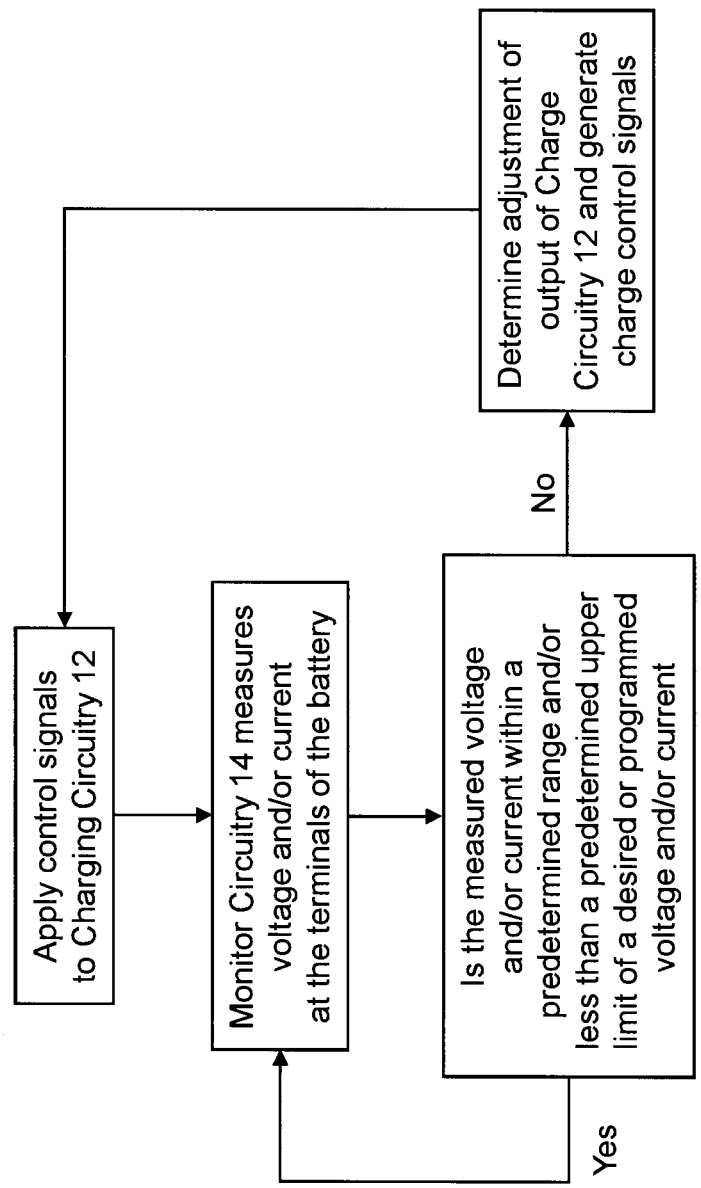
Figure 7C:
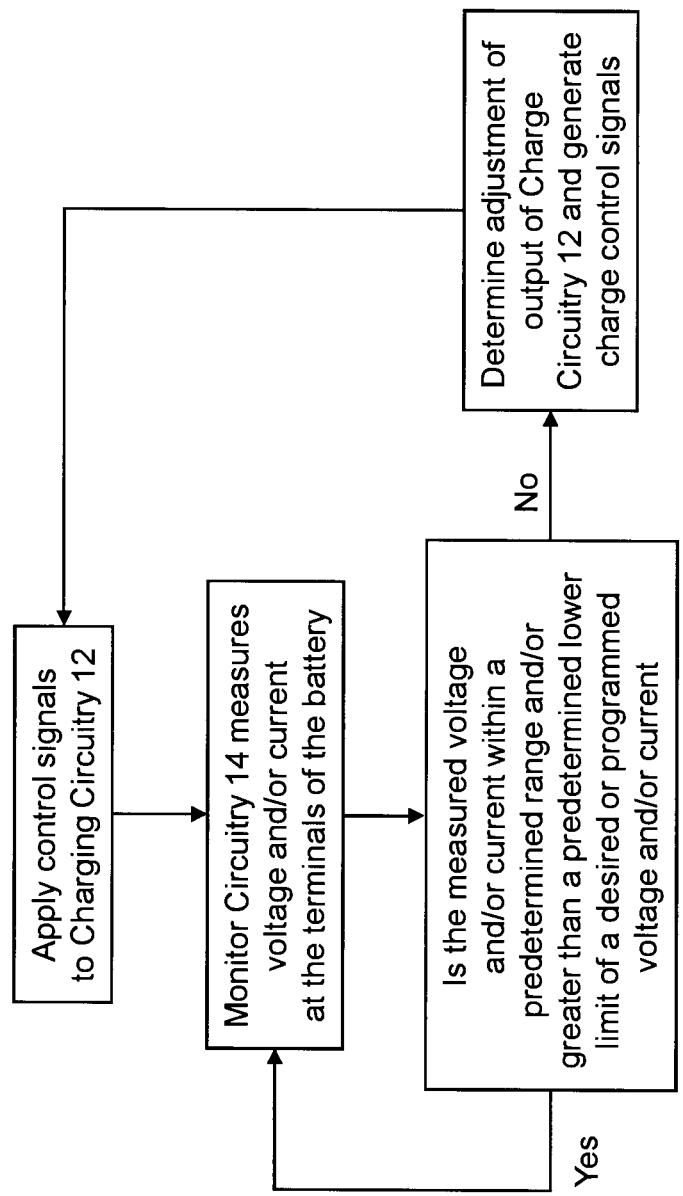
Figure 8A:
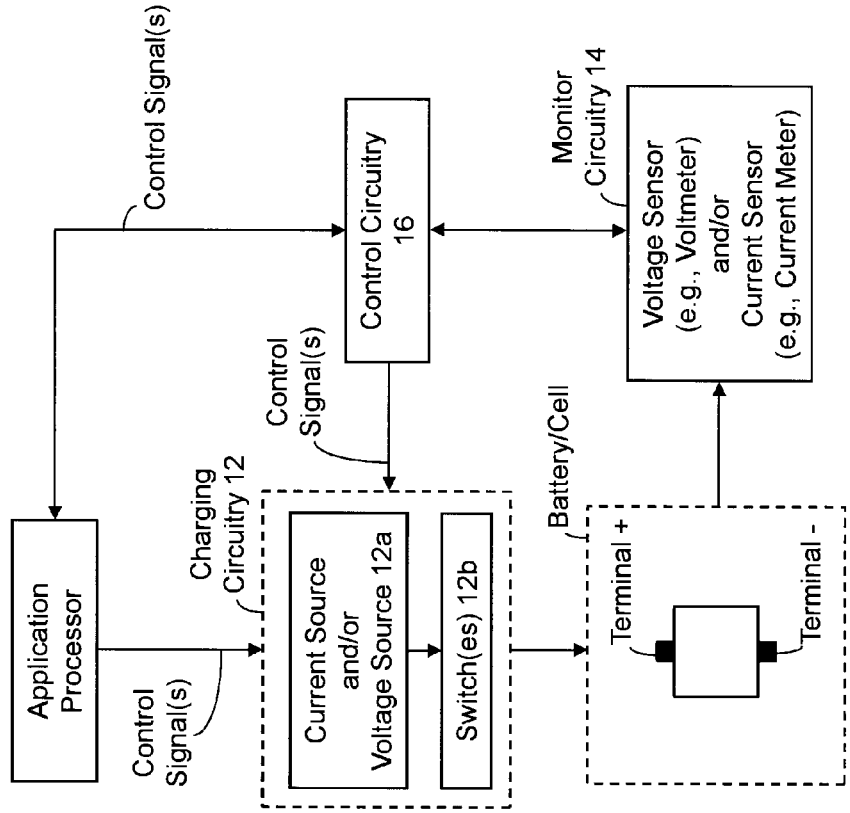
FIGS. 8A-8F illustrate, in block diagram form, exemplary recharge monitor and control circuitry in conjunction with conventional battery or power management circuitry (illustrated as "application processor"), charging circuitry and a battery/cell, according to at least certain aspects of certain embodiments of the present inventions, wherein in these embodiments, the charging circuitry may include voltage source and/or current source and switch(es), and the monitor circuitry may include voltage and/or current sensors (for example, a voltmeter and/or a current meter); notably, the charging circuitry may be entirely (or substantially entirely) physically disposed on, integrated with and/or fixed to the battery/cell (see, for example, FIGS. 8B and 8D), partially physically disposed on, integrated with and/or fixed to the battery/cell (see, for example, switch(es)—FIGS. 8C and 8E) or not physically disposed on, integrated with and/or fixed to the battery/cell (see, for example, FIG. 8F), wherein such charging circuitry may be physically disposed on one or more substrates (for example, the same substrate as the monitor circuitry and/or control circuitry), and wherein in one embodiment, the charging circuitry may be physically disposed on, integrated with and/or fixed to the same substrate as the control and monitor circuitry and wherein such substrate is physically disposed on, integrated in and/or fixed to the battery/cell as a battery/cell pack); notably, the controllable switch(es) of the charging circuitry may be employed to generate one or more charge pulses and/or one or more discharge pulses (see, for example, FIGS. 3A-3D and 4A-4E)
Figure 8B:
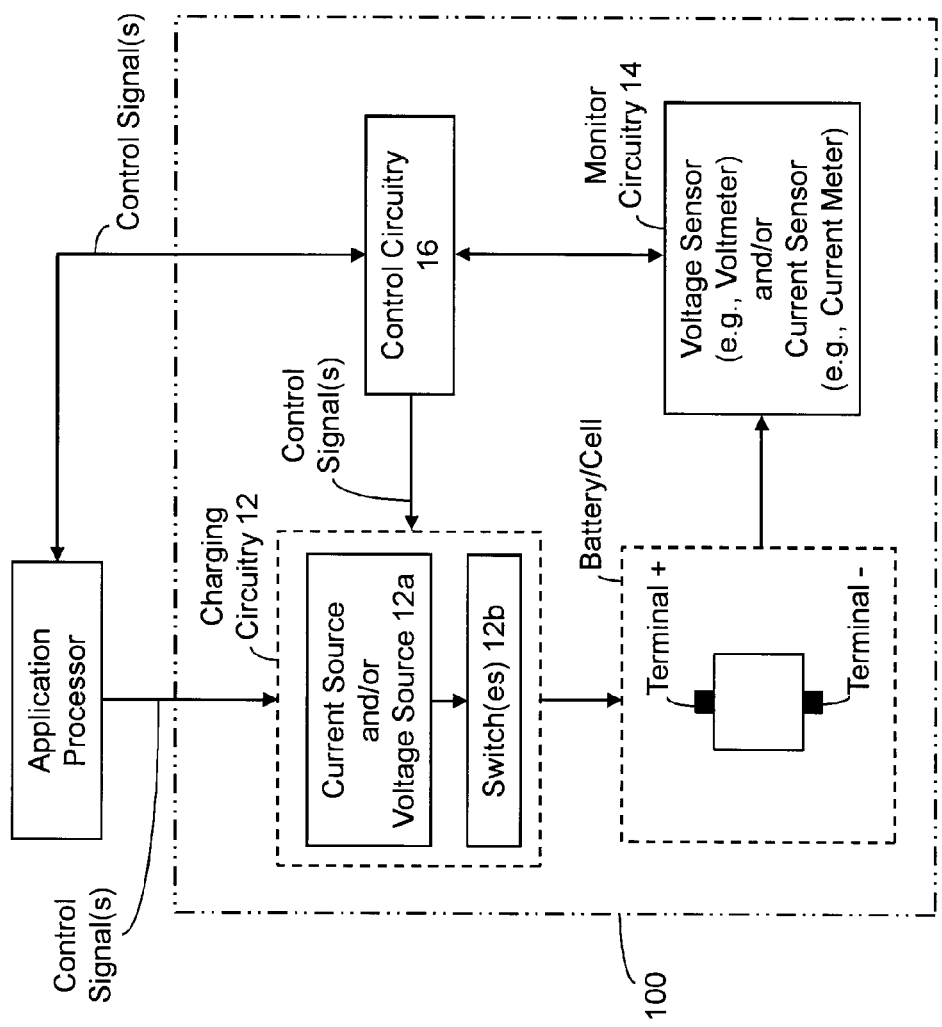
Figure 8C:
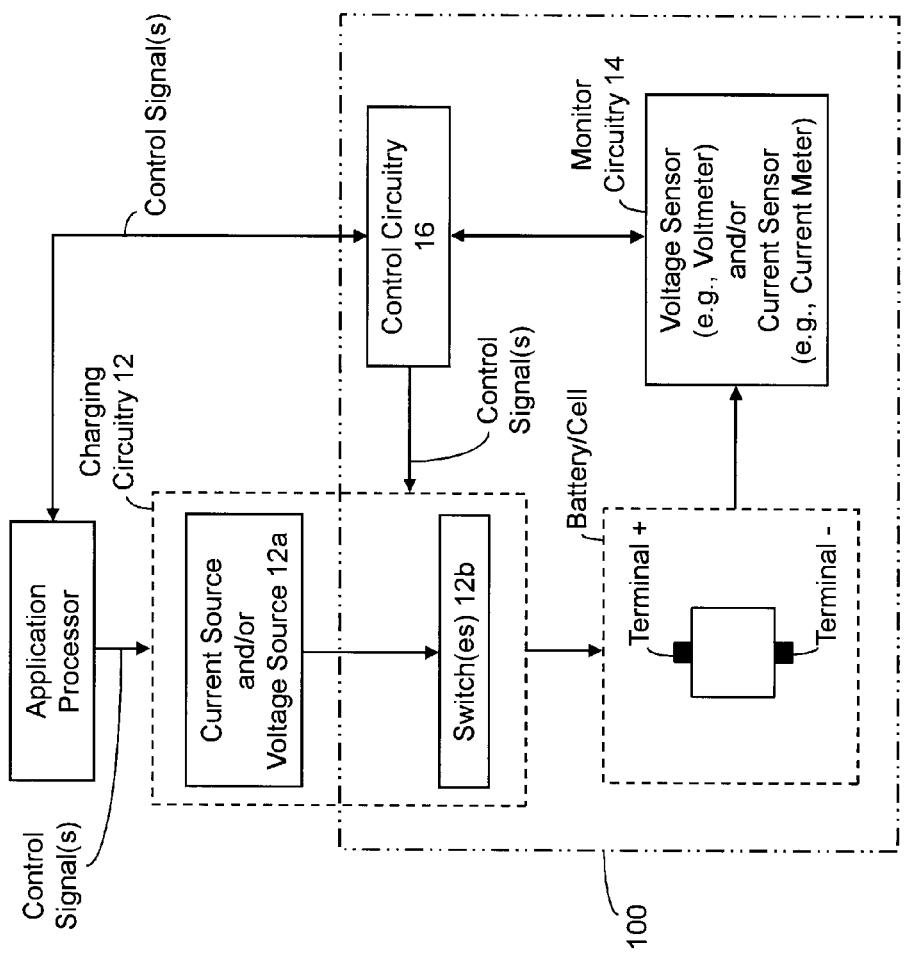
Figure 8D:
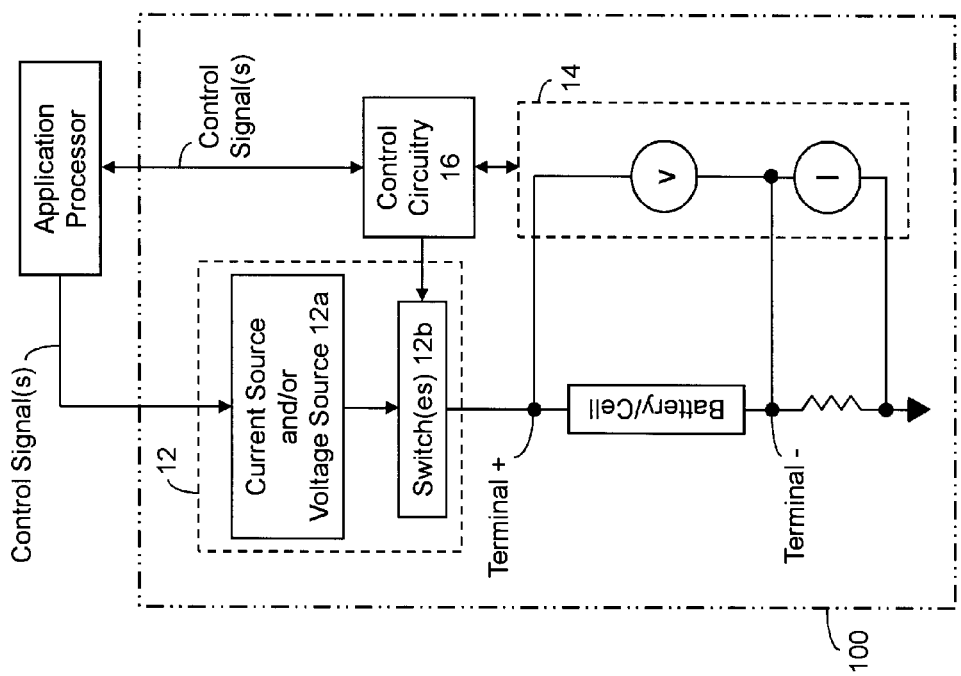
Figure 8E:
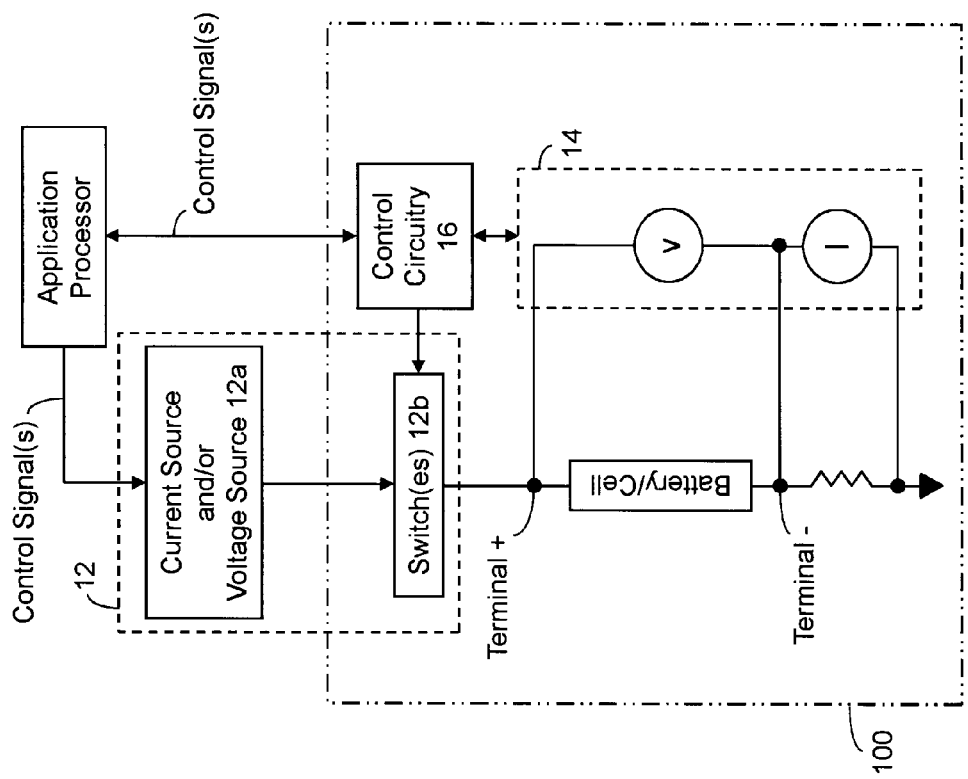
Figure 8F:
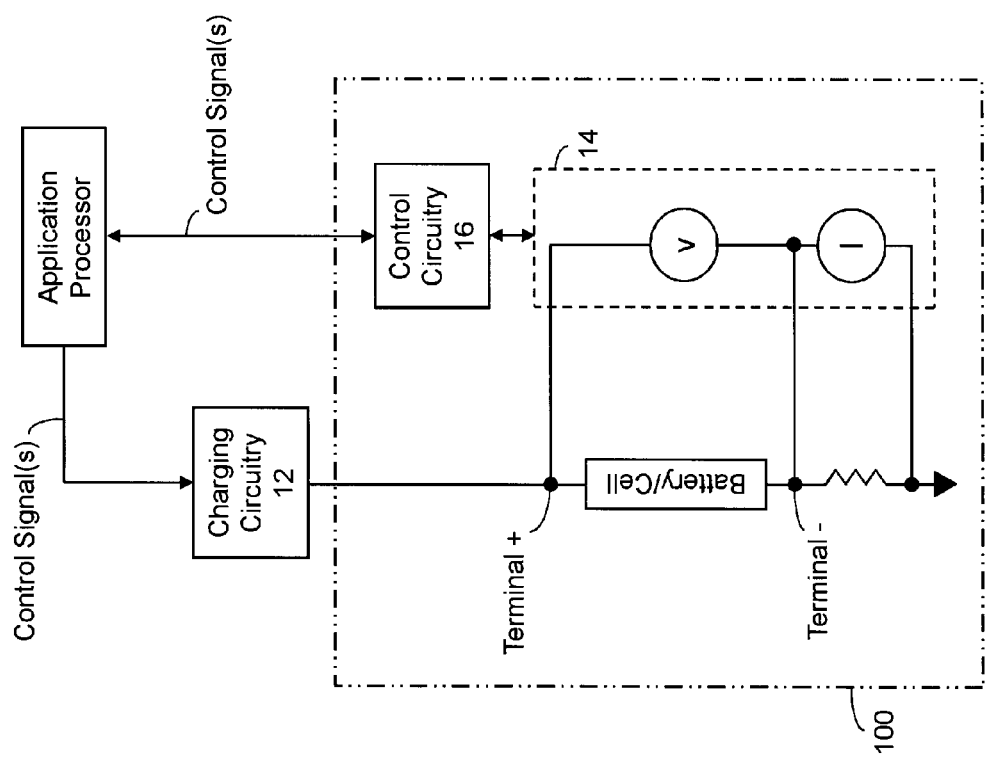

With reference to FIGS. 7A-7C, in operation, control circuitry 16 may receive the voltage and/or current feedback data (for example, data which is in analog or digital form) from monitor circuitry 14 and determine, assess and/or evaluate whether such data is within a predetermined range, above a predetermined first value and/or below a predetermined second value (that is, out-of-specification). Where control circuitry 16 determines such voltage and/or current feedback data are/is out-of-specification, control circuitry 16 generates control signals and (directly or indirectly) control or instructs charging circuitry 12 to adjust one or more characteristics of the charging signal so that the voltage of and/or current applied to or removed from a battery/cell during the charging operation is within-specification (that is, within the predetermined range, below the predetermined first value and/or above the predetermined second value). Notably, for the avoidance of doubt, the inventions are not limited to processes and/or algorithms implemented in accordance with the flow charts of FIGS. 7A-7C; indeed, such flow charts of operation are merely exemplary.

In one embodiment, control circuitry 16 determines whether the amplitude (for example, maximum amplitude) of the voltage and/or current applied to the battery/cell, as indicative of the feedback data measured by monitor circuitry 14, are/is out-of-specification. Where the maximum amplitude of the voltage and/or current is, for example, outside of a predetermined range, control circuitry 16 generates control signals to adjust (increase or decrease) the amplitude of the voltage and/or current charging signal which is applied to the battery/cell and (directly or indirectly) applies control signals to charging circuitry 12. Thereafter, monitor circuitry 14 may again measure the voltage of and/or current applied to or removed from a battery/cell during the charging operation and provide voltage and/or current feedback data to control circuitry 16. In response, control circuitry 16 may again determine whether the amplitude (for example, maximum amplitude) of the voltage and/or current applied to the battery/cell by charging circuitry 12 are/is out-of-specification (for example, outside of a predetermined range).

The monitor circuitry 14 may intermittently, continuously, and/or periodic basis, and/or in response to a triggerable event (for example, when the voltage and/or current output by charging circuitry 12 changes in accordance with a given charging sequence and/or in response to adaptive control) measure, monitor, sense, detect and/or sample one or more conditions or characteristics of the battery/cell (for example, the terminal voltage of the battery/cell and/or current applied to or removed from the battery/cell) during the charging operation. Thereafter, the feedback data (in analog or digital form) is provided to and/or sampled or acquired by control circuitry 16 for analysis or evaluation as described above.

Notably, a triggerable event may include a predetermined change in the voltage and/or current applied to the battery/cell in accordance with a predetermined charging sequence—for example, at a particular state of charge of the battery/cell, the charging circuitry responsively changes the charging signal (for example, a predetermined change in voltage applied to the terminals of the battery/cell and/or (ii) a predetermined change in current applied to or removed from the battery/cell). In one embodiment, the triggerable event may be determined by control circuitry 16 which may, in response to determining such event, instruct monitor circuitry 14 to measure, monitor, sense, detect and/or sample one or more conditions or characteristics of the battery/cell. In another embodiment, the triggerable event may be determined by monitor circuitry 14 (for example, a measured change (which may be exceed a predetermined range or threshold (for example, greater or less than a predetermined range)) in current and/or voltage output by charging circuitry 12. In this embodiment, in response to the triggerable event, monitor circuitry 14 may measure, monitor, sense, detect and/or sample one or more conditions or characteristics of the battery/cell. Indeed, monitor circuitry 14 may also inform or alert control circuitry 16 of such change (for example, set a flag) and, in response, control circuitry 16 may implement any of the operations, techniques and/or function described herein.

In addition thereto, or in lieu thereof, control circuitry 16 may intermittently, continuously and/or periodically, and/or in response to a triggerable event obtain, sample and/or acquire feedback data from monitor circuitry 14 and/or determine whether the one or more characteristics of the charging signal is/are out-of-specification. For example, monitor circuitry 14 may intermittently, continuously and/or periodically, and/or in response to a triggerable event measure, monitor, sense, detect and/or sample (i) the terminal voltage of the battery/cell and/or (ii) current applied to the battery/cell during a recharging operation. Thereafter, control circuitry 16 may intermittently, continuously and/or periodically, and/or in response to a triggerable event sample the feedback data and determine whether such feedback data indicates that the voltage and/or current applied to the battery/cell by charging circuitry 12 is out-of-specification. Where control circuitry 16 determines such voltage and/or current feedback data are/is out-of-specification, control circuitry 16 generates control signals to (directly or indirectly) adjust one or more characteristics of the charging signal of charging circuitry 12 (for example, increase or decrease the amplitude of the current and/or voltage of the charging signal applied to the battery/cell).

The control circuitry 16 may include one or more processors, controllers, state machines, gate arrays, programmable gate arrays and/or field programmable gate arrays, and/or one or more combinations thereof. Indeed, control circuitry 16 and monitor circuitry 14 may share circuitry with each other as well as with other elements; such circuitry may be distributed among a plurality of integrated circuits which may also perform one or more other operations, which may be separate and distinct from that described herein. Moreover, control circuitry 16 may perform or execute one or more applications, routines, programs and/or data structures that implement particular methods, techniques, tasks or operations described and illustrated herein. The functionality of the applications, routines or programs may be combined or distributed. In addition, the applications, routines or programs may be implemented by control circuitry 16 using any programming language whether now known or later developed, including, for example, assembly, FORTRAN, C, C++, and BASIC, whether compiled or uncompiled code; all of which are intended to fall within the scope of the present inventions.

The control circuitry 16 may directly or indirectly control charging circuitry 12. For example, in those embodiments where control circuitry 16 directly controls the amplitude of the voltage and/or current output by charging circuitry 12, control circuitry 16 may generate control signals and directly apply such control signals to charging circuitry 12. In response, charging circuitry 12 provides, generates, changes and/or adjusts the charging signal output by charging circuitry 12 (for example, the amplitude of the voltage and/or current of the charging signal, and, in particular, the maximum amplitude thereof). As such, in these embodiments, the control signals from control circuitry 16 are directly applied to current source and/or voltage source of charging circuitry 12. (See, for example, FIGS. 1F-1L).

In another embodiment, control circuitry 16 indirectly controls charging circuitry 12. With reference to FIGS. 8A-8F, in this embodiment, the system may include a conventional battery or power management circuitry (for example, an application processor) which directly controls charging circuitry 12. For example, in this embodiment, the conventional battery or power management circuitry provides direct control of the current source and/or voltage source of charging circuitry 12. As such, in operation, control circuitry 16, based on or using voltage and/or current feedback data measured by monitor circuitry 14, determines a change necessary to adjust one or more characteristics of the charging signal, and, generates instructions or control signals accordingly. (See FIGS. 7A-7C). The control circuitry 16 applies such instructions or control signals to the conventional battery or power management circuitry. The conventional battery or power management circuitry, in response to such instructions or control signals, adjusts one or more characteristics of the charging signal (for example, the amplitude of the voltage and/or current output by charging circuitry 12) via generating and applying appropriate control signals to charging circuitry 12 (for example, the current source and/or voltage source of charging circuitry 12—see, for example, FIGS. 8D-8F). Thus, in this embodiment, control circuitry 16, based on or using voltage and/or current feedback data measured by monitor circuitry 14, determines a necessary and/or an appropriate adjustment of one or more characteristics of the charging signal (for example, the maximum amplitude of the voltage and/or current signal), and, in response, generates control signals and applies such control signals to the conventional battery or power management circuitry. The management circuitry, in response, implements the adjustments "requested" by control circuitry 16.

As noted above, the control circuitry 16 may intermittently, continuously and/or periodically, and/or in response to a triggerable event obtain, sample and/or acquire the feedback data from monitor circuitry 14 and/or determine whether the one or more characteristics of the charging signal is/are out-of-specification. For example, monitor circuitry 14 may intermittently, continuously and/or periodically, and/or in response to a triggerable event measure, monitor, sense, detect and/or sample (i) the terminal voltage of the battery/cell and/or (ii) current applied to the battery/cell during a recharging operation and thereafter control circuitry 16 may intermittently, continuously and/or periodically, and/or in response to a triggerable event sample the feedback data and determine whether such feedback data indicates that the voltage and/or current applied to the battery/cell by charging circuitry 12 is out-of-specification.

As mentioned above, a triggerable event may include a predetermined change in the voltage and/or current applied to the battery/cell in accordance with a predetermined charging sequence—for example, at a particular state of charge of the battery/cell, charging circuitry 12 responsively changes the charging signal (for example, a predetermined change in voltage applied to the terminals of the battery/cell and/or (ii) a predetermined change in current applied to or removed from the battery/cell). In one embodiment, control circuitry 16 determines a triggerable event by polling one or more of the charging circuitry 12, monitor circuitry 14 and management circuitry to determine whether there is or has been an event (for example, a prescribed or predetermined change in the voltage and/or current output by the charging circuitry) which causes control circuitry 16 to sample the feedback data and, using such feedback data, determine whether the one or more characteristics of the charging signal is/are out-of-specification. In addition thereto, or in lieu thereof, control circuitry 16 may, in response to determining a triggerable event, instruct monitor circuitry 14 to measure, monitor, sense, detect and/or sample one or more conditions or characteristics of the battery/cell (for example, a maximum voltage and/or current applied to the battery/cell by charging circuitry 12). Thereafter, control circuitry 16, using feedback data responsive to such instruction, may determine whether the voltage applied to the battery/cell and/or current applied to or removed from a battery/cell by charging circuitry 12 is out-of-specification (as indicative from the feedback data) and, if so, generate control signals to adjust the output of charging circuitry 12 accordingly.

Figure 9A:
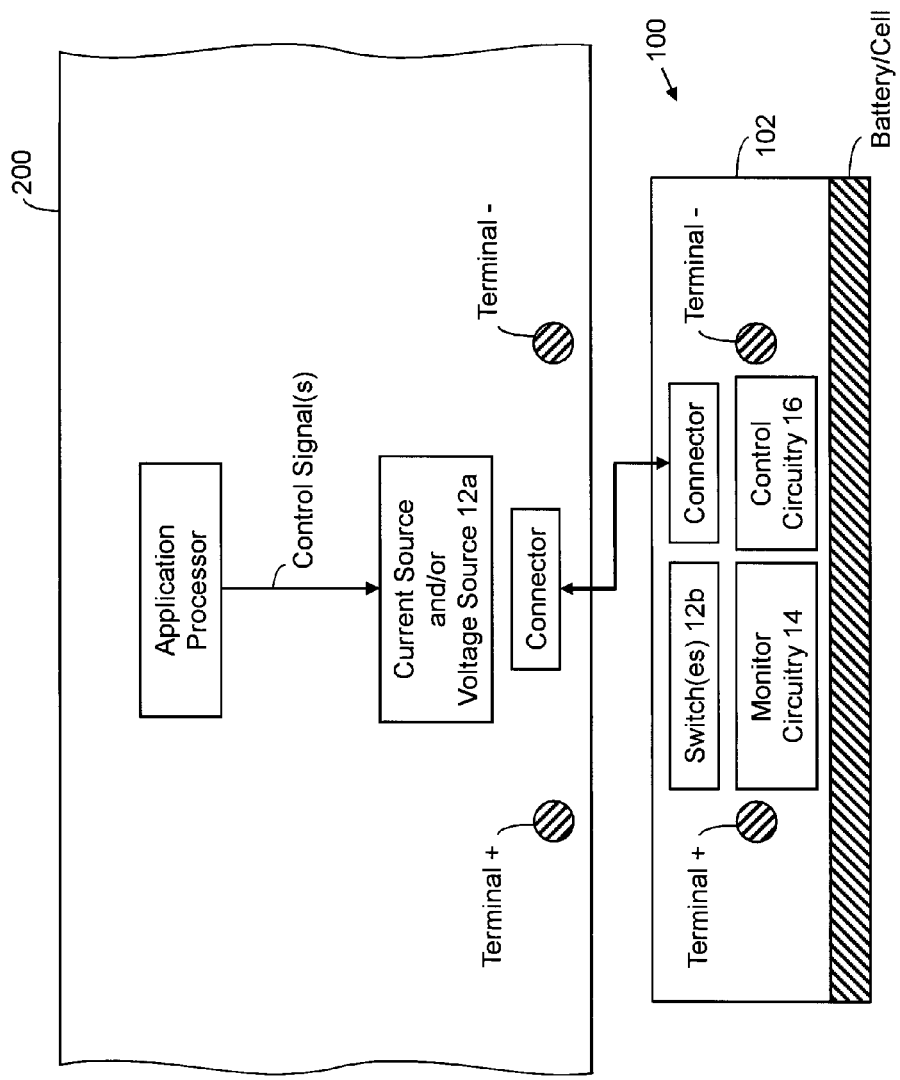
FIGS. 9A-9C illustrate, in block diagram form, recharge monitor and control circuitry and/or components that may reside on the substrate which is physically disposed on, integrated in and/or fixed to the battery/cell pack, in conjunction with a battery/cell, according to at least certain aspects of certain embodiments of the present inventions, wherein a second substrate includes conventional battery or power management circuitry (illustrated as "application processor") which controls aspects of the charging circuitry that may be partially disposed on the second substrate (FIG. 9A), entirely disposed on the second substrate (FIG. 9B) or entirely disposed on the substrate which is physically disposed on, integrated in and/or fixed to the battery/cell (FIG. 9C); notably, the switch(es) of the charging circuitry may be controlled by circuitry of the application processor and/or other control circuitry (for example, control circuitry physically disposed on, integrated in and/or fixed to the battery/cell pack.
Figure 9B:
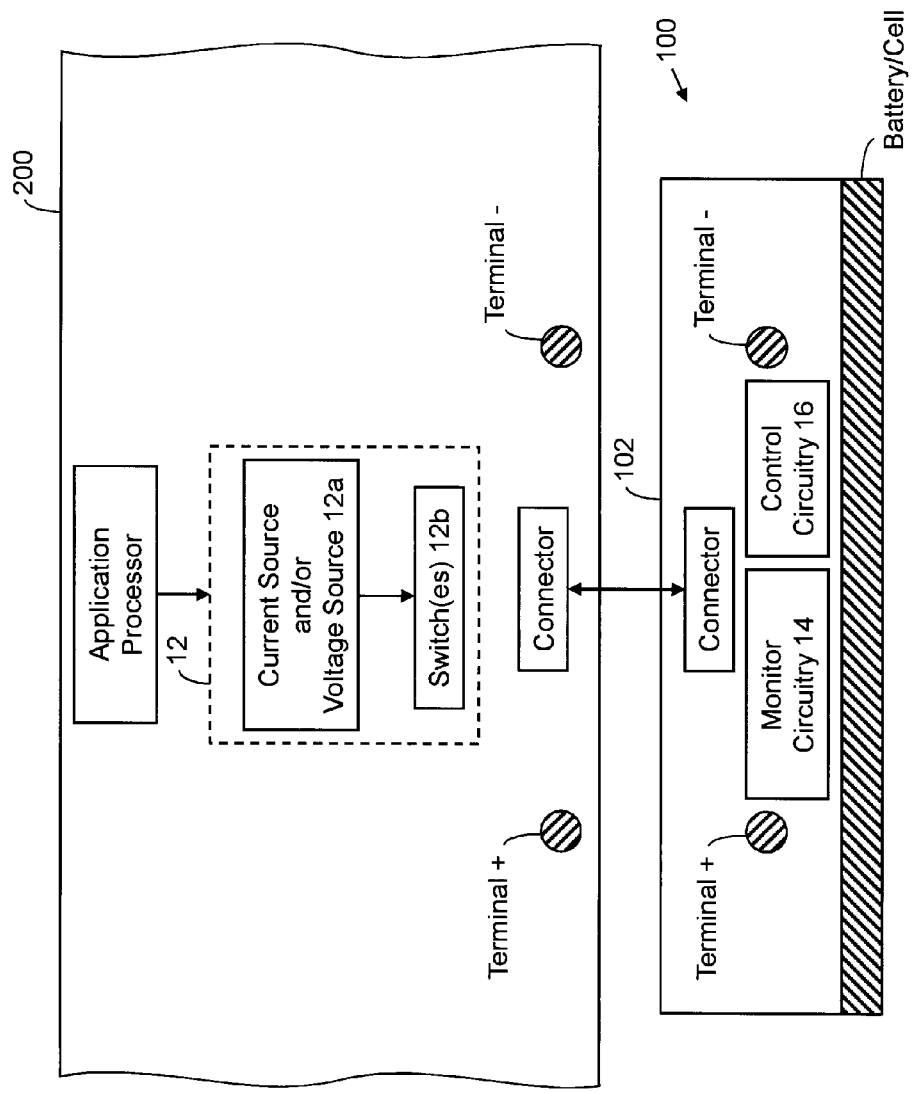
Figure 9C:
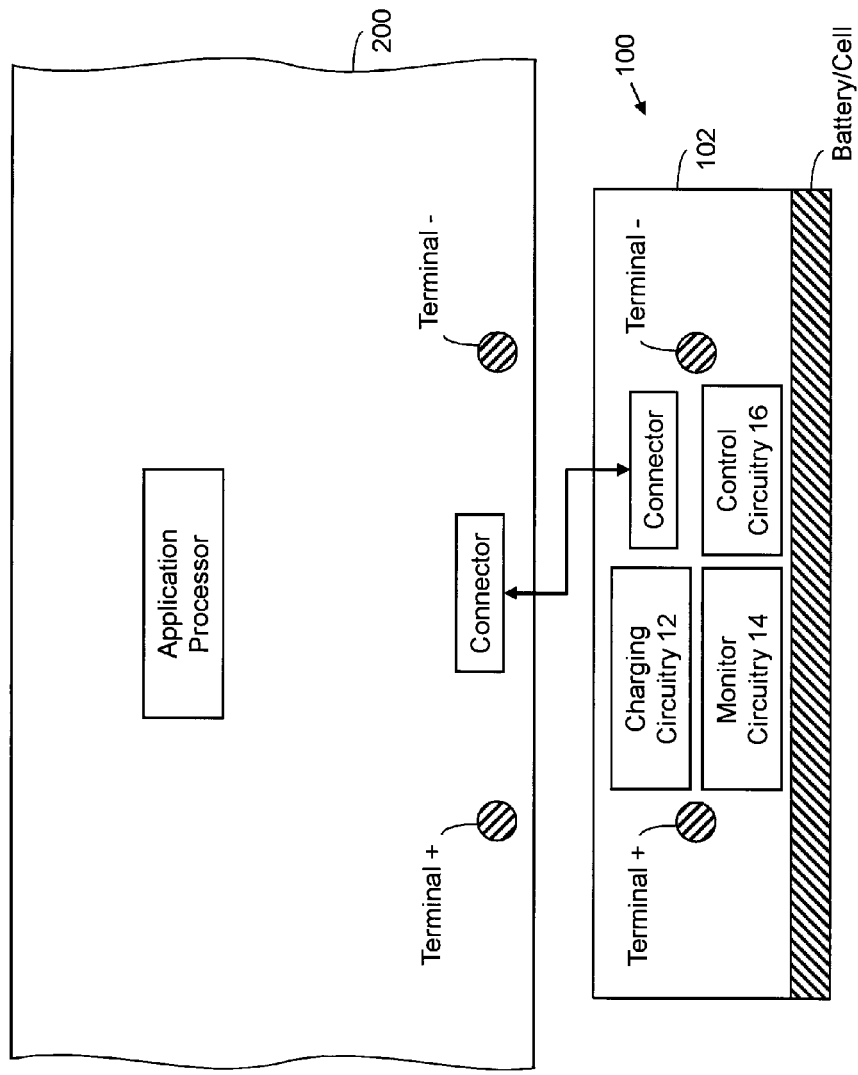

With reference to FIGS. 9A-9C, the conventional battery or power management circuitry (illustrated as "application processor") may reside on substrate 200 which is different and separate from substrate 102 and battery "pack" 100. For example, the application processor may reside on a "mother" or "daughter" board (for example, PCB) to which the battery/cell connects via terminals. In one embodiment, the "mother" or "daughter" board may be a component of consumer electronics equipment, for example, a mobile telephone, mobile game console, digital camera, video recorder, mobile audio/video equipment (for example, MP3 player), calculator, GPS, and personal computer (for example, laptop, tablet or the like) and/or mobile television.

Where charging circuitry 12 resides on substrate 200, charging circuitry 12 electrically connects to the power terminals (see "Terminal +" and "Terminal −" in FIGS. 9A-9C). In these embodiments, the battery/cell receives the charging signal when the power terminals on the substrates interconnect (i.e., the terminals on substrate 200 engage corresponding terminals on the substrate 102). Notably, control circuitry 16, when residing on substrate 102, electrically connects to the conventional battery or power management circuitry. For example, in one embodiment, control circuitry 16 connects with the management circuitry via electrical conductors between contacts on each of substrates 102 and 200. (See "connector" in FIGS. 6A-6C and 9A-9C). Such connectors may be fixed (for example, conductors disposed between substrates 102 and 200 (for example, wires soldered between substrates 102 and 200) or non-fixed (for example, snap-type male or female connectors wherein electrical conductors may be connected between contacts on substrate 102 and/or 200 and an associated connector(s)). Any mechanism, now known or later developed which provides electrical communication between control circuitry 16 and the management circuitry may be employed and is intended to fall within the scope of the present inventions (and deemed a connector or connectors).

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions. Indeed, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

For example, the present inventions may be employed in conjunction with the inventions and/or embodiments described and/or illustrated in U.S. patent application Ser. Nos. 13/626,605 and 13/657,841, which, as mentioned above, are incorporated in their entirety herein by reference. Further, the control circuitry (and techniques implemented thereby) may employ a measured temperature (from monitor circuitry 14) in connection with generation of the control signals to control the charging signal applied to the battery/cell.

Moreover, the battery/cell may be lithium ion technology/chemistry based battery/cell or other technology/chemistry (for example, lithium-cobalt dioxide, lithium-manganese dioxide, lithium-nickel dioxide and lithium-iron phosphate). The inventions described and/or illustrated herein may be implemented in conjunction with any battery or cell chemistries/technologies including, for example, silicon, lithium-ion, nickel-cadmium and other nickel metal hydride chemistries/technologies and lead acid. All battery or cell chemistries/technologies are intended to fall within the scope of the present inventions. It is to be understood that other embodiments may be utilized and operational changes may be made without departing from the scope of the present inventions. Indeed, the foregoing description of the exemplary embodiments of the inventions has been presented for the purposes of illustration and description. It is intended that the scope of the inventions not be limited solely to the description herein.

Further, as noted herein, control circuitry may perform or execute one or more applications, routines, programs and/or data structures that implement particular methods, techniques, tasks or operations described and illustrated herein. The functionality of the applications, routines or programs may be combined or distributed (for example, when distributed among associated or related circuitry, such circuitry is, in combination, control circuitry). Moreover, control circuitry 16 of the present inventions, or portions thereof, and/or one some or all of the functions or operations performed thereby, may be incorporated into battery or power management circuitry. Moreover, certain functions or operations of control circuitry 16 may be distributed or performed by the management circuitry. In one embodiment, this circuitry may be disposed on a substrate which is/are physically disposed on, integrated with and/or fixed to the battery/cell. In another embodiment, such circuitry may be disposed on/in, integrated with and/or fixed to a separate substrate; all of which are intended to fall within the scope of the inventions.

Figure 10A:
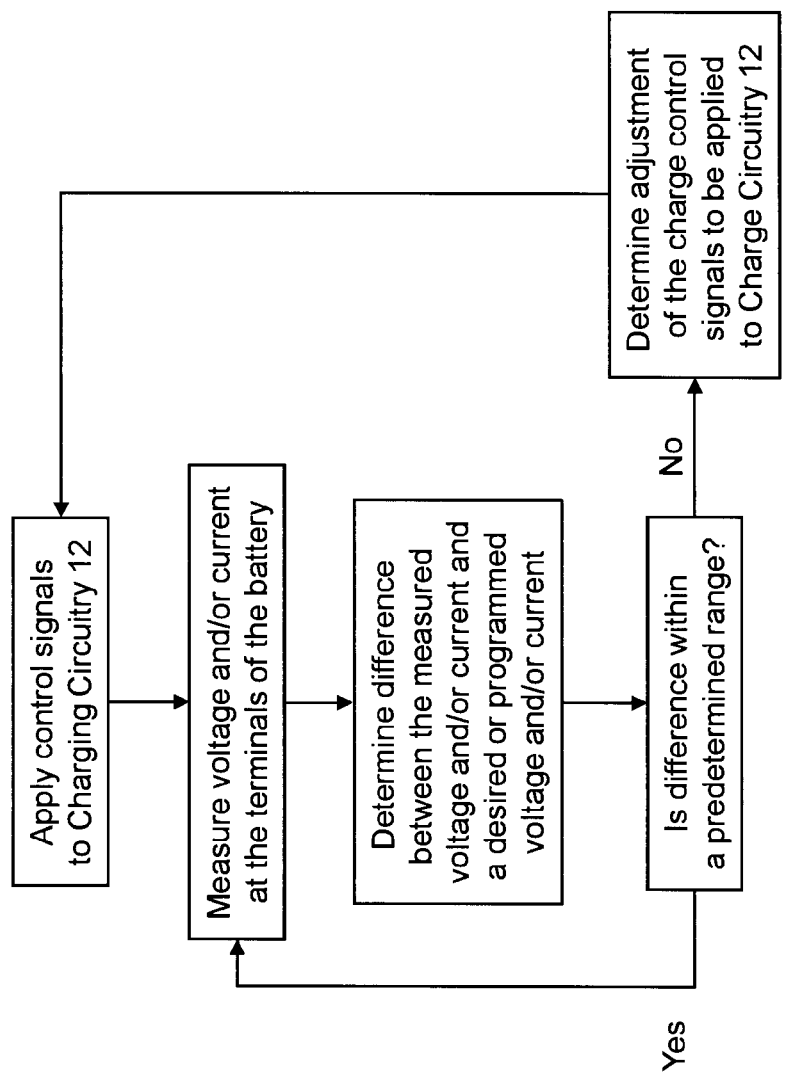
FIGS. 10A-10C are flowcharts of exemplary processes of monitoring and controlling the charging operation of the battery/cell, according to certain aspects of the present inventions, including monitoring one or more characteristics of the signal (for example, the voltage of and/or current applied to or removed from the battery/cell during the charging operation) applied to the battery/cell during the charging operation, and, in response to feedback data (for example, voltage and/or current data) from the monitor circuitry, determine one or more modifications and/or adjustments of the output of the charge circuitry in accordance with the present inventions.
Figure 10B:
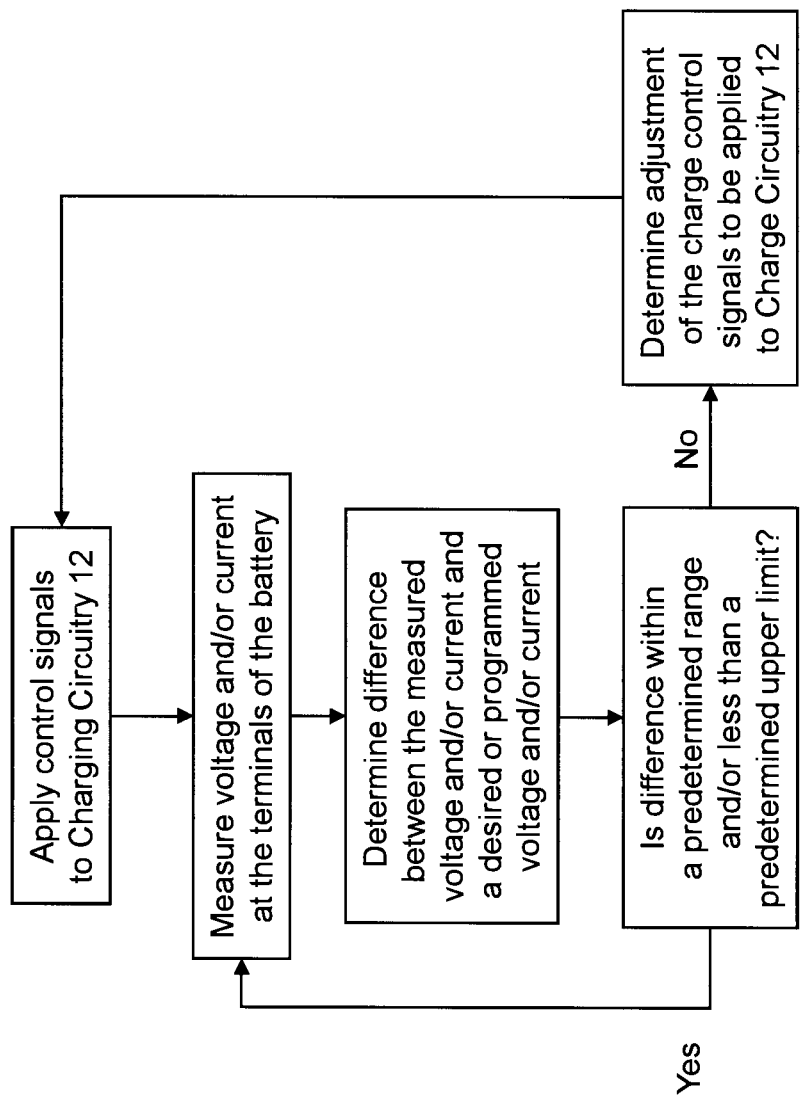
Figure 10C:
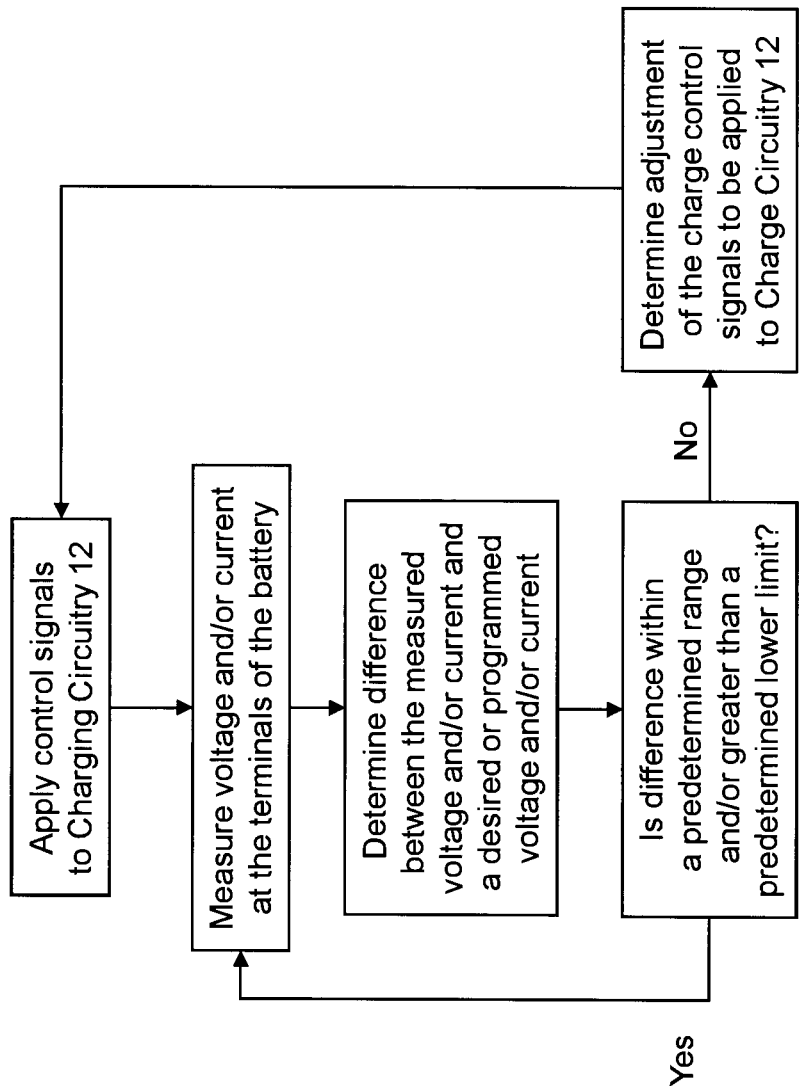

As mentioned above, the inventions are not limited to processes and/or algorithms implemented in accordance with the flow charts of FIGS. 7A-7C. Such flow charts of operation are merely exemplary. The monitor circuitry and control circuitry may implement other processes to control the charging circuitry 12. For example, with reference to FIGS. 10A-10C, in operation, control circuitry 16 may receive the voltage and/or current feedback data (whether in analog or digital form) from monitor circuitry 14 and determine the difference between the measured voltage and/or current (from monitor circuitry 14) and a requested, desired and/or programmed voltage and/or current. The control circuitry 16 may then determine whether the difference is within a predetermined range, above a predetermined first value and/or below a predetermined second value (that is, out-of-specification). For example, control circuitry 16 may determine that the difference between the measured maximum voltage and/or maximum current applied to the battery/cell by charging circuitry 12 (as indicative of the voltage and/or current feedback data provided or measured by monitor circuitry 14) and a requested, desired and/or programmed voltage and/or current is out-of-specification. If so, control circuitry 16 may generate appropriate control signals to adjust the amplitude of the voltage and/or current of the signal which is output by charging circuitry 12 accordingly. That is, where control circuitry 16 determines such voltage and/or current data are/is out-of-specification (for example, the maximum amplitude of the voltage and/or current is less than requested, desired and/or programmed), control circuitry 16 may generate control signals and (directly or indirectly) control or instruct charging circuitry 12 to adjust the amplitude of the charging signal output by the charging circuitry 12 so that the voltage of and/or current applied to or removed from a battery/cell by charging circuitry 12 during the charging operation is within-specification (that is, within the predetermined range, below the predetermined first value and/or above the predetermined second value).

Notably, monitor circuitry 14 and control circuitry 16 of the present inventions may share circuitry as well as share circuitry with other elements of the system (for example, with the battery or power management circuitry). Such shared circuitry may be distributed among a plurality of integrated or discrete circuits which may also perform one or more other operations, which may be separate and distinct from that described herein.

The monitor circuitry and control circuitry may intermittently, continuously and/or periodically, and/or in response to a triggerable event implement the operations of the present inventions. For example, in one embodiment, the monitor circuitry may intermittently, continuously and/or periodically, and/or in response to a triggerable event measure, monitor, sense, detect and/or sample (i) the terminal voltage of the battery/cell and/or (ii) current applied to or removed from the battery/cell during the charging operation. Thereafter, control circuitry 16 may intermittently, continuously and/or periodically, and/or in response to a triggerable event acquire and/or sample the voltage and/or current feedback data. In addition, control circuitry 16 may also intermittently, continuously and/or periodically, and/or in response to a triggerable event determine whether the voltage applied to the battery/cell and/or current applied to or removed from a battery/cell by the charging circuitry is out-of-specification. Thus, the monitor circuitry and/or the control circuitry may intermittently, continuously and/or periodically, and/or in response to a triggerable event implement operations, techniques and/or function to be performed thereby.

As mentioned above, a triggerable event may include a predetermined change in the voltage and/or current applied to the battery/cell in accordance with a predetermined charging sequence—for example, at a particular state of charge of the battery/cell, the charging circuitry responsively changes the charging signal (for example, a predetermined change in voltage applied to the terminals of the battery/cell and/or (ii) a predetermined change in current applied to or removed from the battery/cell in accordance with a given charging operation or process). In one embodiment, the control circuitry may determine the triggerable event by polling the charging circuitry, monitor circuitry and/or management circuitry to determine whether there is or has been a change in the voltage and/or current output by the charging circuitry. Upon determining such event, the control circuitry may instruct the monitor circuitry to measure, monitor, sense, detect and/or sample one or more conditions or characteristics of the battery/cell. In addition thereto, or in lieu thereof, the control circuitry may obtain, sample, acquire the feedback data from the monitor circuitry in response to determining a triggerable event. Using such feedback data, the control circuitry may implement any of the operations, techniques and/or function described herein.

At times, the terms battery and cell have been employed interchangeably to mean an electrical storage device that may be electrically charged and discharged. Such a device may include a single electrical cell, or may include several cells electrically connected in series and/or parallel to form a battery of larger electrical capacity. It shall be noted that the embodiments for adaptive charging described herein shall apply to either cells or batteries, as a single unit or multiple units electrically configured into a larger battery pack. Such battery pack may include separate monitor circuitry, as described herein, for each cell or a subset of cells, or for the entire battery. Moreover, control circuitry may be implemented in the same manner (i.e., control circuitry dedicated to each cell or a subset of cells, or for the entire battery. Any of the embodiments of the monitor circuitry and control circuitry described herein may be implemented in such multi-cell configurations. Indeed, all combinations and permutations thereof are intended to fall within the scope of the present invention.

As noted above, the present inventions may be implemented as battery "pack" 100 wherein monitor circuitry 14 resides on or in substrate 102 which is physically disposed on, integrated with and/or fixed to the battery/cell to measure, detect and/or monitor the amplitude of the voltage of and/or current applied to or removed from a battery/cell during the charging operation. In one embodiment, the monitor circuitry 14 implements Kelvin-type measurement configurations in that little to no current is required to determine the voltage at the terminals of the battery/cell and/or the current through the battery/cell. The control circuitry 16 may also reside on or in substrate 102 and battery pack 100 interfaces with an application processor that resides on a "mother" or "daughter" board (for example, PCB) via the terminals on of the battery pack 100. (See, FIGS. 8A-8F). The control circuitry 16 and application processor cooperate to control the charging operation of the battery/cell. Notably, battery pack 100 of the present inventions may be employed in consumer electronics equipment, for example, a mobile telephone, mobile game console and/or personal computer (for example, laptop, tablet or the like). (See, for example, FIGS. 9A-9C).

Although several of the exemplary embodiments are described and/or illustrated in the context of charging circuitry including switch(es) (for example, to facilitate implementation of and/or generate a pulse charging/re-charging sequence or operation (see, for example, FIGS. 3A-3D and 4A-4E), the charging circuitry described and/or illustrated herein may also be implemented without switch(es). For example, the present inventions may be implemented with any charging sequence, operation or cycle, for example, CCCV charging sequence. In those embodiments where a CCCV charging sequence is employed, the charging circuitry may not include switch(es). With that in mind, the embodiments described and illustrated herein may or may not include switch(es). For the sake of brevity, such embodiments will not be re-illustrated without switch(es). Thus, the charging circuitry set forth herein in the context of implementing a pulse charging technique are merely exemplary; and other circuitry and charging techniques may be employed whereby particular circuitry may be employed to implement such charging techniques. To be sure, however, all charging techniques, and circuitry to implement such techniques, are intended to fall within the scope of the present inventions. Moreover, in certain embodiments, all, some or none of such charging circuitry may be disposed on, integrated with and/or fixed to the battery/cell and/or reside on or in a substrate (upon which the monitor circuitry and in certain embodiments control circuitry reside) which, for example, is disposed on, integrated with and/or fixed to the battery/cell.

Notably, a "circuit" means, among other things, a single component (for example, electrical/electronic) or a multiplicity of components (whether in integrated circuit form, discrete form or otherwise), which are active and/or passive, and which are coupled together to provide or perform a desired operation. In addition, "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the herein described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a fabrication process.

Moreover, the various circuits and circuitry, as well as techniques, disclosed herein may be represented via simulations using computer aided design and/or testing tools. The simulation of the charging circuitry, control circuitry and/or monitor circuitry, and/or techniques implemented thereby, may be implemented by a computer system wherein characteristics and operations of such circuitry, and techniques implemented thereby, are imitated, replicated and/or predicted via a computer system. The present inventions are also directed to such simulations of the inventive charging circuitry, control circuitry and/or monitor circuitry, and/or techniques implemented thereby, and, as such, are intended to fall within the scope of the present inventions. The computer-readable media corresponding to such simulations and/or testing tools are also intended to fall within the scope of the present inventions.

In the claims, the term "calculate" and other forms (i.e., calculating, calculated and calculation) means, among other things, calculate, assesses, determine and/or estimate and other forms thereof. Further, the term "battery" means an individual cell (which stores energy) and/or a plurality of cells arranged electrically in a series and/or parallel configuration. Also, the phrase "fixed to" in the claims means disposed on or in, integrated with, on or in, and/or secured or affixed to. The term "substrate", in the claims, means one substrate, at least one substrate and one or more substrates. The term "evaluate" in the claims means consider, assess, compare, and/or evaluate.

In addition, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. Further, the term "data" may mean, among other things, a current or voltage signal(s) whether in analog or a digital form (which may be a single bit (or the like) or multiple bits (or the like)).

What is claimed is:

1. A rechargeable battery system which is rechargeable via a charging signal generated during a single recharging cycle, the rechargeable battery system comprising:
   a battery having at least two terminals;
   charging circuitry including:

a plurality of controllable switches, fixed to the battery and electrically coupled to the at least two terminals of the battery, to generate a plurality of pulses of the charging signal during the single recharging cycle;

recharge monitor and control circuitry including:
monitor circuitry fixed to the battery and electrically coupled to the at least two terminals of the battery, including:
a current meter to: (i) measure a current applied to or removed from the battery by the charging signal and (ii) output feedback current data; and
a voltmeter to (i): measure a voltage between the at least two terminals of the battery and (ii) output feedback voltage data; and
control circuitry, electrically coupled to the monitor circuitry, to: (i) receive the feedback current data and/or feedback voltage data and, in response thereto, (ii) evaluate the feedback current data and/or the feedback voltage data, and (iii) generate one or more control signals to adjust an amplitude of the current and/or voltage of the pulses of the charging signal using the feedback current data and/or the feedback voltage data.

2. The rechargeable battery system of claim 1 further including a substrate fixed to the battery wherein (i) the monitor circuitry is fixed to the substrate and (ii) the plurality of controllable switches are fixed to the substrate.

3. The rechargeable battery system of claim 1 wherein the control circuitry, in response to a change in the voltage and/or current output by the charging circuitry to the battery, evaluates the feedback current data and/or the feedback voltage data.

4. The rechargeable battery system of claim 1 wherein the plurality of controllable switches responsively generate a charging signal having a plurality of charge pulses and a plurality of discharge pulses.

5. The rechargeable battery system of claim 1 wherein the control circuitry is fixed to the battery.

6. The rechargeable battery system of claim 5 further including a substrate fixed to the battery wherein (i) the monitor circuitry is fixed to the substrate, (ii) the plurality of controllable switches are fixed to the substrate, and (iii) the control circuitry is fixed to the substrate.

7. The rechargeable battery system of claim 1 wherein:
the feedback current data is representative of a maximum amplitude of the current applied to or removed from the battery by the charging circuitry; and/or
the feedback voltage data is representative of a maximum amplitude of a voltage applied to the battery by the charging circuitry.

8. The rechargeable battery system of claim 7 wherein the control circuitry polls the charging circuitry and/or the monitor circuitry to determine a triggerable event and, in response thereto, the control circuitry evaluates the feedback current data and/or the feedback voltage data.

9. A rechargeable battery pack which is rechargeable via a charging signal output by charging circuitry generated during a single recharging cycle, the rechargeable battery pack comprising:
a battery having at least two terminals;
a plurality of controllable switches of the charging circuitry, fixed to the battery and electrically coupled to the at least two terminals of the battery, to generate a plurality of pulses of the charging signal during the single recharging cycle; and
recharge monitor and control circuitry fixed to the battery, the recharge monitor and control circuitry including:
monitor circuitry electrically connected to the battery to generate (i) feedback current data by measuring an amplitude of a current of the charging signal applied to or removed from the battery by the plurality of controllable switches of the charging circuitry and/or (ii) feedback voltage data by measuring an amplitude of a voltage of the charging signal applied to the battery by the plurality of controllable switches of the charging circuitry; and
control circuitry, electrically coupled to the monitor circuitry, to (i) generate one or more control signals using the feedback current data and/or the feedback voltage data and (ii) output the one or more control signals to the plurality of controllable switches to adjust a current and/or voltage of the charging signal of the charging circuitry.

10. The rechargeable battery pack of claim 9 wherein control circuitry periodically acquires the feedback current data and/or feedback voltage data and, in response generates the one or more control signals to adjust the current and/or voltage of the charging signal of the charging circuitry using the feedback current data and/or the feedback voltage data.

11. The rechargeable battery pack of claim 9 wherein control circuitry, in response to a triggerable event, acquires the feedback current data and/or feedback voltage data and, in response to the feedback current data and/or feedback voltage data, generates the one or more control signals to adjust the current and/or voltage of the charging signal of the charging circuitry using the feedback current data and/or the feedback voltage data.

12. The rechargeable battery pack of claim 11 wherein the triggerable event includes a change in voltage and/or current of the charging circuitry during a recharging operation.

13. The rechargeable battery pack of claim 11 wherein the triggerable event includes a predetermined change in voltage and/or current of the charging circuitry during a recharging operation.

14. The rechargeable battery pack of claim 9 wherein the plurality of controllable switches responsively generate the charging signal and wherein the plurality of pulses of the charging signal include a plurality of charge pulses and a plurality of discharge pulses.

15. The rechargeable battery pack of claim 14 further including a wrap to substantially encapsulate (i) the battery, (ii) the plurality of controllable switches and (iii) the recharge monitor and control circuitry.

16. A rechargeable battery system which is rechargeable via a charging signal output by charging circuitry generated during a single recharging cycle, the rechargeable battery system comprising:
a battery having at least two terminals;
a substrate fixed to the battery;
a plurality of controllable switches of the charging circuitry, electrically coupled to the at least two terminals of the battery, to generate a plurality of pulses of the charging signal during the single recharging cycle;
recharge monitor and control circuitry including:
monitor circuitry, fixed to the substrate and electrically connected to the battery, including:
a current meter, fixed to the substrate and electrically connected to the battery, to: (i) measure an amplitude of the current of the charging signal applied to the battery and (ii) output feedback current data; and
a voltmeter, fixed to the substrate and electrically connected to the battery, to (i): measure a voltage and (ii) output feedback voltage data; and control circuitry, electrically coupled to the monitor circuitry, to: (i) receive the feedback current data and/or feedback voltage data and, in response thereto, (ii) calculate an adjustment of a current and/or voltage of the charging signal using the feedback current data and/or the feedback voltage data.

17. The rechargeable battery system of claim 16 wherein the substrate includes at least two terminals, wherein each terminal of the at least two terminals of the substrate electrically engage an associated terminal of the at least two terminals of the battery.

18. The rechargeable battery system of claim 17 wherein the at least two terminals of the substrate receives the charging signal of the charging circuitry.

19. The rechargeable battery system of claim 18 wherein the plurality of controllable switches are fixed to the substrate and electrically coupled between the at least two terminals of the substrate and the at least two terminals of the battery.

20. The rechargeable battery system of claim 16 wherein the control circuitry generates one or more control signals to adjust the amplitude of the current and/or voltage of the pulses of the charging signal using the feedback current data and/or the feedback voltage data.

21. The rechargeable battery system of claim 20 wherein the control circuitry applies the one or more control signals to the plurality of controllable switches.

22. The rechargeable battery system of claim 16 wherein the plurality of controllable switches responsively generate the charging signal and wherein the plurality of pulses of the charging signal include a plurality of charge pulses and a plurality of discharge pulses.

23. The rechargeable battery system of claim 16 wherein:
the feedback current data is representative of a maximum amplitude of the current applied to or removed from the battery by the charging circuitry; and/or
the feedback voltage data is representative of a maximum amplitude of a voltage applied to the battery by the charging circuitry.

24. The rechargeable battery system of claim 16 wherein the control circuitry polls the charging circuitry and/or the monitor circuitry to determine a triggerable event and, in response thereto, the control circuitry evaluates the feedback current data and/or the feedback voltage data and, where the feedback current data and/or the feedback voltage data is out-of-specification, calculates an adjustment of a current and/or voltage of the charging signal using the feedback current data and/or the feedback voltage data.

25. The rechargeable battery system of claim 16 further including a wrap to substantially encapsulate (i) the battery, (ii) the plurality of controllable switches and (iii) the monitor circuitry into a rechargeable battery pack.

\* \* \* \* \*